(12) United States Patent
Pearl, Jr. et al.

(10) Patent No.: US 11,092,539 B2
(45) Date of Patent: Aug. 17, 2021

(54) ANALYTE-INDUCED CHIROPTICAL CHANGES

(71) Applicant: Halliburton Energy Services, Inc., Houston, TX (US)

(72) Inventors: William Cecil Pearl, Jr., Houston, TX (US); Megan Renee Pearl, Houston, TX (US); Neal Gregory Skinner, Lewisville, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 708 days.

(21) Appl. No.: 15/755,651

(22) PCT Filed: Nov. 11, 2015

(86) PCT No.: PCT/US2015/060100
§ 371 (c)(1),
(2) Date: Feb. 27, 2018

(87) PCT Pub. No.: WO2017/082891
PCT Pub. Date: May 18, 2017

(65) Prior Publication Data
US 2020/0232907 A1    Jul. 23, 2020

(51) Int. Cl.
*G01N 21/21* (2006.01)
*E21B 49/08* (2006.01)

(52) U.S. Cl.
CPC .......... *G01N 21/21* (2013.01); *E21B 49/081* (2013.01); *E21B 49/0875* (2020.05); *G01N 2201/0633* (2013.01); *G01N 2201/084* (2013.01)

(58) Field of Classification Search
CPC ..................................................... G01N 21/21
See application file for complete search history.

(56) References Cited

U.S. PATENT DOCUMENTS

| | | |
|---|---|---|
| 5,891,395 A | 4/1999 | Sorensen et al. |
| 8,502,982 B2 | 8/2013 | Mace et al. |
| (Continued) | | |

OTHER PUBLICATIONS

Cremer et al., "Influence of the Substituent on the Chiroptical Properties of Poly(thieno[3,2-b]thiophene)s", Macromolecules, vol. 41, No. 3, 2008, pp. 568-578.

(Continued)

*Primary Examiner* — Tarifur R Chowdhury
*Assistant Examiner* — Omar H Nixon
(74) *Attorney, Agent, or Firm* — Kilpatrick Townsend & Stockton LLP

(57) ABSTRACT

Systems and methods are provided for determining a presence, type, or amount of an analyte in fluid. An analyte sensor can include a substrate that includes a chiral molecule for sensing the presence of the analyte in the fluid. A property of the chiral molecule may change in response to sensing the presence of the analyte. The change in the property of the chiral molecule can cause a change in polarization of a beam of light traveling through the substrate. The presence, type, or amount of the analyte can be determined based on the change in polarization of the beam of light. The analyte sensor, along with optical fibers, can be used to determine the presence, type, or amount of an analyte in a fluid sample from a wellbore.

20 Claims, 15 Drawing Sheets

(56) References Cited

U.S. PATENT DOCUMENTS

| | | | |
|---|---|---|---|
| 2005/0128482 A1 | 6/2005 | Gibbs | |
| 2006/0114470 A1* | 6/2006 | Takashima | G01B 11/0625 356/453 |
| 2008/0087078 A1* | 4/2008 | Vannuffelen | G01J 3/433 73/152.54 |
| 2010/0231911 A1* | 9/2010 | Fischer | G01J 4/02 356/364 |
| 2014/0107942 A1 | 4/2014 | Dasgupta et al. | |
| 2014/0172302 A1* | 6/2014 | Kalia | E21B 47/113 702/6 |
| 2014/0326860 A1 | 11/2014 | Choi et al. | |
| 2015/0253243 A1 | 9/2015 | Cho et al. | |
| 2016/0356917 A1* | 12/2016 | Bhongale | G01V 5/04 |

OTHER PUBLICATIONS

Deng et al., "Chiroptically Active Photonics Polymers: Synthesis and Chiroptically Switching Properties of Helical Polyacetylene Bearing Electrochromic Viologens in the Side Chains", Macromolecules, vol. 42, No. 18, 2009, pp. 6865-6872.

Geng et al., "Synthesis, Characterization, and Optical Properties of Monodisperse Chiral Oligofluorenes", Journal of the American Chemical Society, vol. 124, No. 28, 2002, pp. 8337-8347.

Hill et al., "A Field Guide to Foldamers", Chemical Reviews, vol. 101, No. 12, 2001, pp. 3893-4011.

Innami et al., "Synthesis and Properties of Poly(Isothianaphthene Methine)s with Chiral Alkyl Chain", Materials, vol. 5, No. 2, 2012, pp. 317-326.

Meudtner et al., "Helicity Inversion in Responsive Foldamers Induced by Achiral Halide ion Guests", Communications, vol. 47, No. 26, Jun. 16, 2008, pp. 4926-4930.

International Patent Application No. PCT/US2015/060100, "International Search Report and Written Opinion", dated Aug. 1, 2016, 15 pages.

Schade et al., "Determination of Orientational States in Impact—Polystyrene Specimens by Near-Infrared Polarization Spectroscopy", Polymer Engineering and Science, vol. 46, No. 3, Mar. 2006, pp. 381-383.

Seehafer et al., "Aggregation, Acidochromicity, and Metallochromicity of a Pyridine-Based Poly(aryleneethynylene)", Macromolecules, vol. 47, No. 3, 2014, pp. 922-927.

Wang et al., "Design and Synthesis of Metal Ion-Recognition-Induced Conjugated Polymers: An Approach to Metal Ion Sensory Materials", Journal of the American Chemical Society, vol. 119, No. 1, 1997, pp. 12-21.

Yashima et al., "Synthesis and Conformational Study of Optically Active Poly(phenylacetylene) Derivatives Bearing a Bulky Substituent", Macromolecules, vol. 28, No. 12, Jun. 1995, pp. 4184-4193.

* cited by examiner

ANALYTE-INDUCED CHIROPTICAL CHANGES

TECHNICAL FIELD

The present disclosure relates generally to wellbores. More specifically, but not by way of limitation, this disclosure relates to determining a presence, type, or quantity of an analyte in a fluid sample that may be in a wellbore, based on a change in a property of chiral molecules.

BACKGROUND

A well system (e.g., oil or gas wells for extracting fluids from a subterranean formation) can include equipment or components for use during well operations (e.g., during drilling, completion, production, etc.). During well operations, fluid in the wellbore can include an analyte (e.g., a substance whose chemical constituents are to be identified or measured). It may be challenging to identify or measure the presence, type, or amount of the analyte in the fluid.

DETAILED DESCRIPTION

Figure 1:
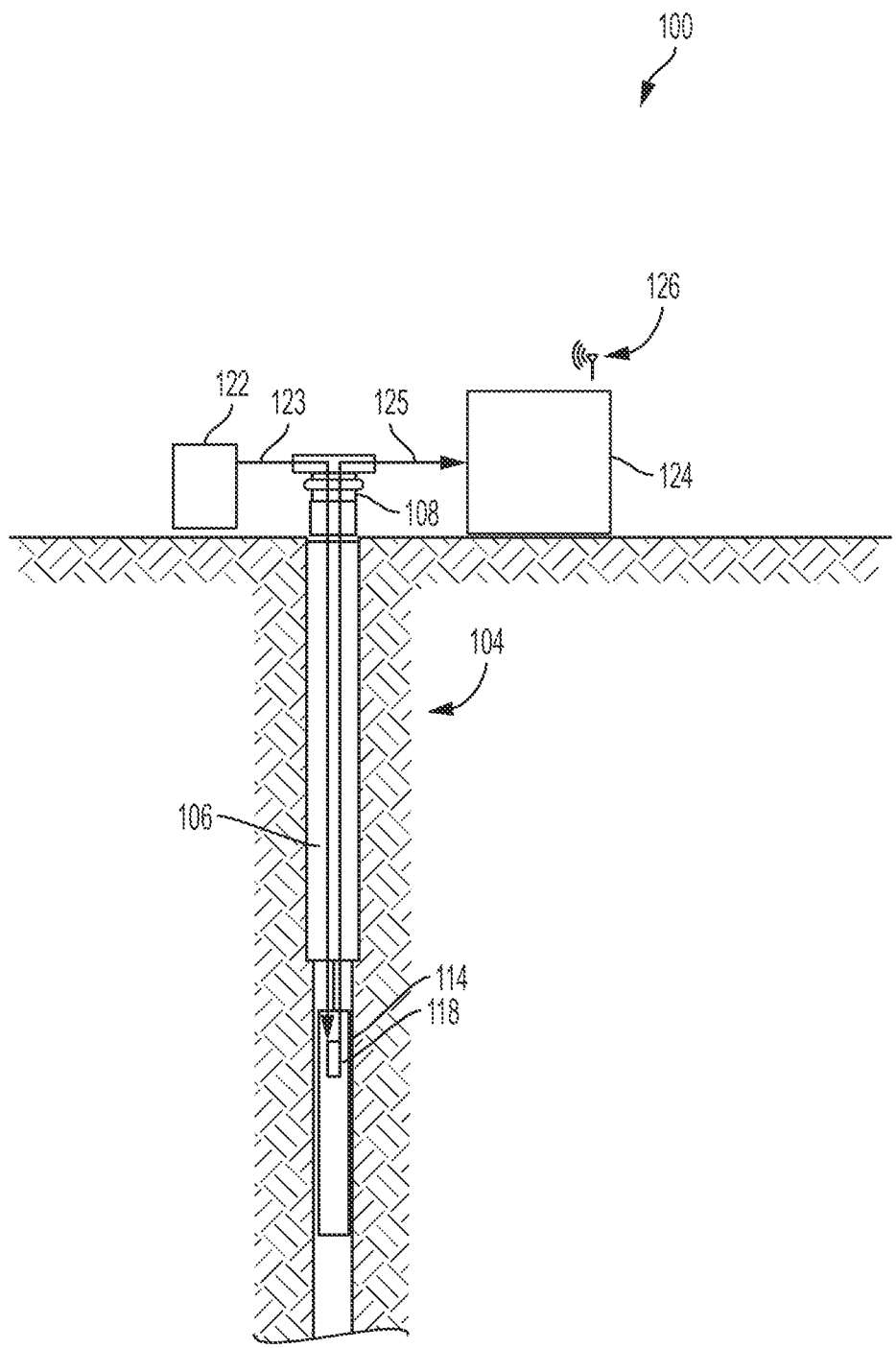
FIG. 1 is a schematic diagram of a well system that can include a system for determining a presence, type, or quantity of an analyte in a fluid sample, according to one example of the present disclosure.

Certain aspects and features of the present disclosure are directed to determining a presence, type, or quantity of an analyte in a fluid sample based on a change in a property of a chiral molecule. An analyte may be a substance whose chemical constituents are to be identified or measured. A chiral molecule may be a molecule that has an asymmetrical form or a molecule that is not superimposable on its mirror image.

During operations on a well system (e.g., during drilling, completion, production, etc.), a sample of fluid from a wellbore can include an analyte (e.g., a chemical substance). An analyte sensor can be used to determine the presence, type, or quantity of the analyte in the sample. Using the analyte sensor to determine the presence, type, or quantity of the analyte can enhance well operations. For example, the presence, type, or quantity of an analyte in the sample of fluid can be used to determine whether fluid in the sample is pure or suitable to be collected from the wellbore. As another example, the presence, type, or quantity of an analyte in fluid from a wellbore can be used to determine the content or make up of fluid in the wellbore. In still another example, the presence, type, or quantity of an analyte in fluid from the wellbore can be used to determine water breakthrough or a hydrocarbon producing interval or zone. In some examples, multiple analyte sensors can be used to determine the presence, type or quantity of analytes in samples of fluid from different locations in the wellbore. The presence, type, or quantity of analytes in samples of fluid from different locations can be used to determine changes in the chemical constituents of fluid throughout the wellbore.

For example, a system can include a light source and the analyte sensor. The light source can provide a light beam. The light beam can travel along a path toward the analyte sensor. The analyte sensor can include a substrate that includes a chiral molecule. The substrate, along with the chiral molecule, can be in a sample chamber. A fluid sample can flow through, or be in, the sample chamber. The chiral molecule can sense the presence of an analyte in the fluid sample in the sample chamber. A property (e.g., optical activity, chiroptical property, position, orientation, rotation, or helicity) of the chiral molecule may change in response to the molecule sensing the presence of the analyte. The light beam can be polarized before passing through the sample chamber. The change in the property of the chiral molecule may cause a change in polarization of the light beam as the light beam passes through the substrate in the sample chamber. The presence, type, or amount of the analyte can be determined based on the change in polarization of the light beam.

In some examples, the analyte sensor can include other components for determining the presence, type, or amount of the analyte. For example, a component of the analyte sensor may change the polarization state the light beam. Other components may divide the light beam into multiple light paths and polarize light in the multiple light paths. Some components may detect polarized light in the multiple light paths. In some examples, components of the analyte sensor can be positioned near the substrate that includes the chiral molecule. For example, the other components can be positioned in a path of the light beam before the light beam travels through the substrate or in the path of the light beam after the light beam passes through the substrate. Positioning the components of the analyte sensor near the substrate can allow the analyte sensor to be used to determine the change in polarization of the light beam as the light beam passes through the substrate in the sample chamber.

In some examples, the analyte sensor, or components of the analyte sensor, can be positioned at various locations in a well system (e.g., within a wellbore, near a surface of the wellbore, or elsewhere). An optical fiber can be used with the analyte sensor for determining the presence, type, or quantity of an analyte in a fluid sample from the wellbore. For example, an optical fiber can be used to guide the light from the source to the analyte sensor or to a component of the analyte sensor. Another optical fiber can be used to guide light, or a portion of the light, from the component of the analyte sensor to another component of the analyte sensor or to a surface of the wellbore.

Determining the presence, type, or amount of an analyte in fluid from a wellbore can enhance operations on the wellbore. For example, the presence, type, or quantity of an analyte in the fluid can be used to determine whether fluid in the wellbore is pure or suitable to be collected from the wellbore. As another example, the presence, type, or quantity of an analyte in fluid from a wellbore can be used to determine the content or make up of fluid in the wellbore. In some examples, multiple analyte sensors can be used to determine the presence, type or quantity of analytes in samples of fluid from different locations in the wellbore. The presence, type, or quantity of analytes in samples of fluid from different locations can be used to determine changes in the chemical constituents of fluid throughout the wellbore.

In some examples, using optical fibers with an analyte sensor that includes chiral molecules for sensing the presence of an analyte can increase the efficiency of determining the presence, type, and amount of an analyte in a sample of fluid from a downhole environment. For example, optical fibers and the analyte sensor can be used to determine the content or make up of fluid in the wellbore while the fluid is in the wellbore. Determining the content of fluid in the wellbore while the fluid is in the wellbore can be advantageous over determining the content of the fluid after transporting the fluid to the surface. For example, determining the content of the fluid while the fluid is in the wellbore can provide more accurate data about the content of the fluid. In another example, data about the content of the fluid while the fluid is in the wellbore may be used to determine whether the fluid is pure or suitable to be collected from the wellbore.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a schematic diagram of well system 100 that can include a system for determining a presence, type, or quantity of an analyte in a fluid sample, according to one example of the present disclosure.

In this example, the well system 100 can be an oil or gas well system for extracting fluid from a subterranean formation 104. The well system 100 includes a wellbore 102 extending through various earth strata. The wellbore 102 extends through the hydrocarbon bearing subterranean formation 104. The well system 100 can also include at least one well tool 114 (e.g., a measuring-while-drilling ("MWD") tool, a logging-while-drilling ("LWD") tool, or a wireline formation-testing tool).

In some examples, fluid in the wellbore 102 may contain an analyte (e.g., a chemical substance). Examples of an analyte include, but are not limited to, solvents, hydrocarbons, water, dissolved chemicals, or any chemical substance that can be in a fluid from a wellbore.

The well system 100 can include, among other things, a computing device 124. The computing device 124 can be positioned at the surface 108 of the wellbore 102, below ground, or off-site. The computing device 124 can include a processor interfaced with other hardware via a bus. A memory, which can include any suitable tangible (and non-transitory) computer-readable medium, such as RAM, ROM, EEPROM, or the like, can embody program components that configure operation of the computing device 124. In some examples, the computing device 124 can include input/output interface components (e.g., a display, keyboard, touch-sensitive surface, and a mouse) and additional storage.

The computing device 124 can include a communication device 126 for transmitting and receiving data. The communication device 126 can represent one or more of any components that facilitates a network connection.

The well system 100 can also include a light source 122. The light source 122 can be any device for providing or generating light. The light source 122 can be positioned at the surface 108, a remote location, or elsewhere in the well system 100.

The well system 100 can also include an analyte sensor 118. The analyte sensor 118 can be a system or device for detecting or sensing the presence of an analyte. As an example, the analyte sensor 118 can sense the presence of an analyte in a fluid sample. The analyte sensor 118 can be positioned near the well tool 114 or elsewhere in the well system 100. In some examples, the analyte sensor 118, or components of an analyte sensor 118, can be positioned within the wellbore 102 or proximate to a surface 108. In some examples, positioning the analyte sensor 118, or components of the analyte sensor 118, in the wellbore 102 can be advantageous over positioning the analyte sensor 118 elsewhere in the well system 100, such as at the surface 108. For example, positioning the analyte sensor 118 in the wellbore 102 can allow the analyte sensor 118 to more accurately and efficiently detect the presence of an analyte in a fluid sample from the wellbore 102. In some examples, the analyte sensor 118, or a component of the analyte sensor 118, can be communicatively coupled to the computing device 124. For example, the analyte sensor, or a component of the analyte sensor 118 can transmit data or an electrical signal to the computing device 124.

In some examples, optical fibers 123, 125 can be used with the light source 122, and the analyte sensor 118 for determining the presence, type, or amount of an analyte in a sample of fluid from the wellbore 102. For example, optical fiber 123 can be coupled to the light source 122. The optical fiber 123 can guide a light from the light source 122 to the analyte sensor 118. The optical fiber 125 can form a path for polarized light to travel up-hole, from the analyte sensor 118 toward the computing device 124 at the surface 108.

Figure 2:
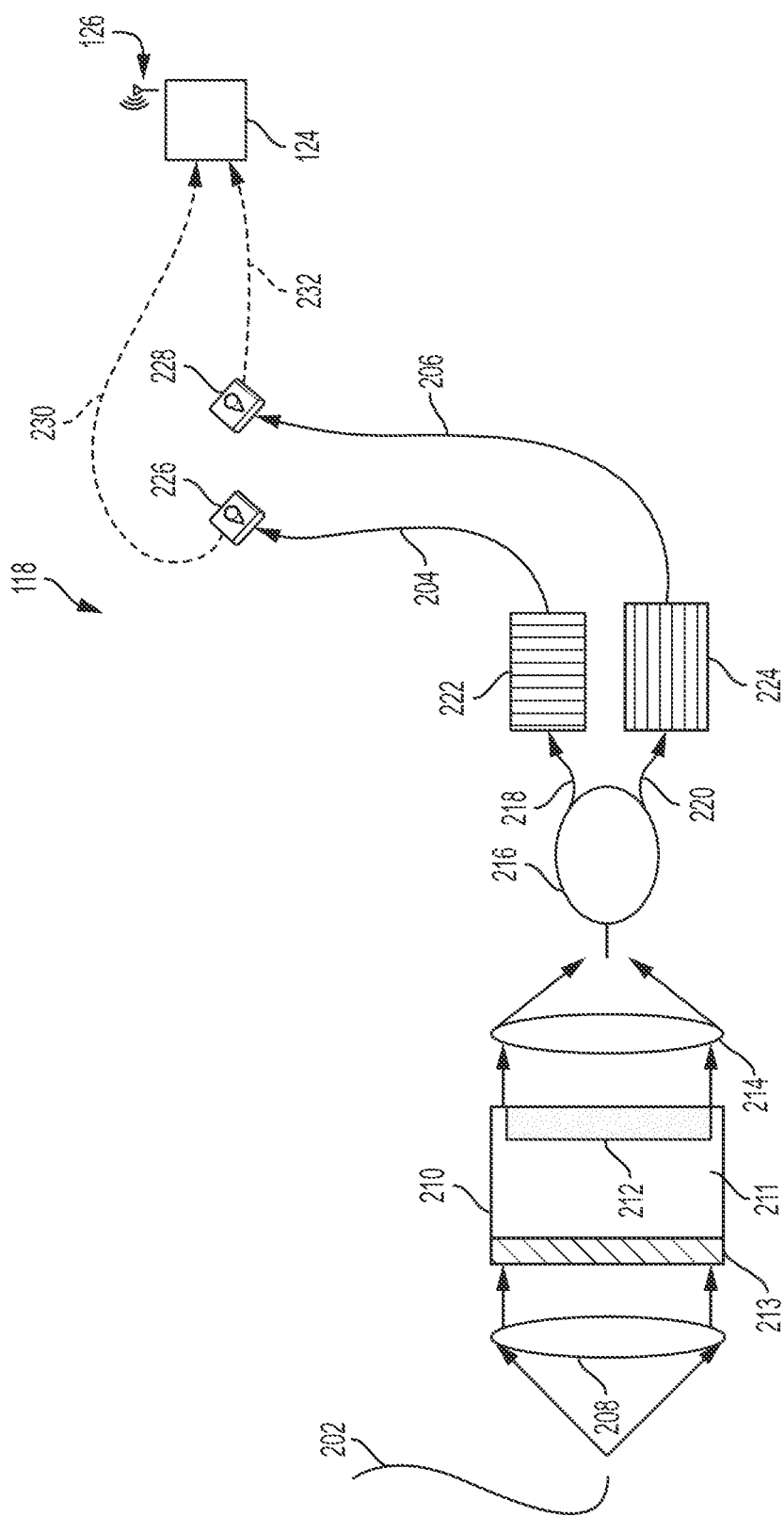
FIG. 2 is a schematic diagram of an example of an analyte sensor, along with optical fibers and a computing device, which can be used for determining the presence, type, or amount of an analyte in fluid according to one example of the present disclosure.

FIG. 2 is a schematic diagram of an example of an analyte sensor 118, along with optical fibers 202, 204, 206, and a computing device 124, which can be used for determining the presence, type, or amount of an analyte in fluid.

In some examples, the optical fiber 202 can be coupled to a light source (e.g., the light source 122 in FIG. 1). The optical fiber 202 can be coupled to the light source to form a path for the light (e.g., guide or direct the light) from the light source. The optical fiber 202 can guide the light to the analyte sensor 118.

The analyte sensor 118 may include collimators 208, 214. The collimators 208, 214 can each be any device for adjusting or expanding light from the fiber into a collimated beam or concentrating a collimated beam of light back into a fiber. In some examples, the collimators 208, 214 can each be a device for causing a direction of motion of the light from an optical fiber to become more aligned in a particular direction (e.g., make collimated light or parallel rays). In another example, the collimators 208, 214 may cause a spatial cross-section of the light beam to become smaller, may narrow the light beam, or focus the light beam into an optical fiber. In the example depicted in FIG. 2, the collimators 208, 214 can include a lens that can convert a cone of light that may emanate from an end of an optical fiber (e.g., from the end of the optical fiber 202) into a collimated light beam. In some example, the lens of each collimator 208, 214 can be used to focus a collimated light beam into the acceptance angle of a receiving optical fiber. In another example, each of the collimators 208, 214 can be a graded index lens or a GRIN lens, which can be used to spread out a light from an optical fiber into a collimated light beam and later concentrate the light beam from the collimated light beam into another receiving optical fiber.

The collimators 208, 214 can be positioned in a path of the light from the light-source for adjusting the light. As an example, the collimator 208 can be positioned between the optical fiber 202 and a sample chamber 210. The light can expand as the light exits the optical fiber 202. The collimator 208 can adjust the light prior to the light beam entering the sample chamber 210. The collimator 214 can be positioned subsequent to a substrate 212 in the sample chamber 210. The collimator 214 can adjust the light beam after the light beam traverses the substrate 212. For example, the collimator 214 can narrow or recapture the light beam after the light beam traverses the substrate.

The analyte sensor 118 can also include a reference polarizer 213. The reference polarizer can be any device for polarizing light. For example, the reference polarizer 213 can be a device that can pass light of a particular polarization and block light of any other polarization. In some examples, the reference polarizer 213 can convert light of undefined or mixed polarization into light with a particular polarization (e.g., convert unpolarized light into linearly polarized light). As an example, the reference polarizer 213 can be a forty-five degree polarizer, which can allow light polarized in the forty-five degree plane to pass through the reference polarizer 213. The reference polarizer 213 can be positioned in the path of the light beam before the light beam enters the sample chamber 210. For example, the reference polarizer 213 can be positioned between the collimator 208 and the sample chamber 210. The reference polarizer 213 can polarize the light beam after the light beam passes through the collimator 208 and prior to the light beam entering the sample chamber 210. In some examples, polarizing the light beam with the reference polarizer 213 can cause the light beam to have a reference polarization angle. The reference polarization angle can correspond to an angle of polarization of the light beam prior to the light beam entering the sample chamber 210. In some examples, if the light beam entering the sample chamber 210 is unpolarized, the reference polarizer 213 can be omitted from analyte sensor 118.

The analyte sensor 118 can include a substrate 212. The substrate 212 can be any material on which a process or reaction may occur. The substrate 212 may include a chiral molecule (e.g., a molecule that has an asymmetrical structure or a molecule that is not superimposable on its mirror image). Non-limiting examples of a chiral molecule include a chiral alkyl chain, a chiral polymer, a folded polymer, or any other molecule that has a chiral property. The chiral molecule may be on, embedded in, or anchored to the substrate. For example, the chiral molecule can be anchored on one end to the substrate 212. As another example, a rod structure can be anchored at one end to the substrate 212. The chiral molecule can be positioned along the rod structure. In still another example, the substrate 212 can include, or be, a film or an optically active film (e.g., a film of chiral molecules). The film may be of any size or thickness. The film can be created using various methods including, for example, spin coating and dip coating.

The substrate 212, along with the chiral molecule, can be in the sample chamber 210. For example, the substrate 212 including the chiral molecule can be positioned on a wall of the sample chamber 210. In some examples, the substrate 212 can be positioned on a wall of the sample chamber 210 that is perpendicular to a path of the light beam. The sample chamber 210 can be any chamber or passage. In some examples, the sample chamber 210 can allow fluid to flow in, or through, the sample chamber 210. For example, the sample chamber 210 may include a channel 211 for allowing fluid to flow through the sample chamber 210.

The sample chamber 210, along with the substrate 212 and the chiral molecule, can be positioned near the reference polarizer 213. In some examples when a sample chamber is not included in the analyte sensor 118, the substrate 212, along with the chiral molecule, can be positioned near the reference polarizer 213. Positioning the sample chamber 210 near the reference polarizer 213 may allow the light beam passing through the reference polarizer 213 to enter the sample chamber 210 and traverse the substrate 212.

In some examples, the chiral molecule included in the substrate 212 may be a sensing molecule. For example, the chiral molecule may sense (e.g., detect a presence) of an analyte in a sample of fluid in the sample chamber 210. For example, the channel 211 may allow a fluid sample or fluid to flow through the sample chamber 210. The chiral molecule may sense the presence of an analyte in the fluid as the fluid flows through the sample chamber 210. For example, the chiral molecule may interact with the fluid as the fluid flows through the sample chamber 210. Interaction between the chiral molecule and an analyte in the fluid can cause a change in a property of the chiral molecule in response to a presence, type, or amount of the analyte. In some examples, the change in the property of the chiral molecule in response to the presence, type and amount of the analyte may cause a change in a polarization state (e.g., polarization angle) of the light beam as the light beam traverses the substrate 212.

The analyte sensor 118 can also include a splitter 216. The splitter 216 can be any device for dividing a light beam or guided light in a fiber. For example, the splitter 216 can be a 1×2 fiber optic coupler. As another example, the splitter can be a beamsplitter. In some examples, the splitter 216 can be positioned in the path of the light beam. For example, the splitter 216 can be positioned near the sample chamber 210 or the collimator 214 to receive the light beam after the light beam traverses the sample chamber 210 or the collimator 214. The splitter 216 can divide the light beam after the light beam traverses the substrate 212 or after the light beam exits the sample chamber 210. In some examples, dividing the light beam using the splitter 216 can create multiple light paths. For example, the splitter 216 can divide the light beam into light paths 218, 220. In some examples, the splitter 216 can have an output through which each of the light paths 218, 220 can exit the splitter 216.

The analyte sensor 118 can also include orthogonal or directional polarizers 222, 224. Each directional polarizer 222, 224 can be any device for polarizing light. For example, each directional polarizer 222, 224 can be a device for passing light of a particular polarization and blocking light of any other polarization. In some examples, each directional polarizer 222, 224 can convert light of an undefined or mixed polarization into light with a specific polarization (e.g., convert unpolarized light into linearly polarized light). In some examples, the directional polarizer 222 can be a vertical polarizer. In some examples, the directional polarizer 224 can be a horizontal polarizer. In some examples, the directional polarizers 222, 224 can be positioned near the splitter 216 for polarizing light in a light path formed from dividing the light with the splitter 216. For example, the directional polarizer 222 can be positioned near the splitter 216 for polarizing light in the light path 218. Polarizing light in the light path 218 can form polarized light. The directional polarizer 224 can be positioned near the splitter 216 for polarizing light in the light path 220. Polarizing light in the light path 220 can form light with another state of polarization. In examples where the directional polarizers 222, 224 are a vertical polarizer and a horizontal polarizer, respectively, the directional polarizer 222 can polarize light in the light path 218 to form vertical polarized light and the directional polarizer 224 can polarizer light in the light path 220 to form horizontal polarized light.

The analyte sensor 118 can include photodetectors 226, 228. The directional polarizers 222, 224 can be communicatively coupled to the photodetectors 226, 228, respectively. Each photodetector 226, 228 can be any device for detecting or sensing light. In some examples, each photodetector 226, 228 may absorb optical energy and convert the optical energy to electrical energy. For example, each photodetector 226, 228 can detect light and convert the light into an electrical signal. In some examples, the photodetectors 226, 228 may be positioned in the light paths 218, 220, respectively for converting polarized light in the light paths 218, 220 into electrical signals. For example, the photodetector 226 can be coupled to the directional polarizer 222 via optical fiber 204 for receiving polarized light in the light path 218. The photodetector 228 can be coupled to the directional polarizer 224 via optical fiber 206 for receiving polarized light in the light path 220. The photodetector 226 can convert polarized light in the light path 218 into an electrical signal that indicates an amount of polarized light in the light path 218. As an example, the electrical signal can indicate an amount of vertical polarized light in the light path 218. The photodetector 228 can convert polarized light in the light path 220 into another electrical signal that indicates an amount of polarized light in the light path 220. As an example, the other electrical signal can indicate an amount of horizontal polarized light in the light path 220. In some examples, the analyte sensor 118, or components of the analyte sensor 118 can be positioned in a downhole environment (e.g., in the wellbore 102 in FIG. 1), in free space (e.g., at a surface 108 of the wellbore 102 in FIG. 1), or elsewhere. In the example depicted in FIG. 2, the collimators 208 and 214, the reference polarizer 213, the sample chamber 210 along with the substrate 212, the splitter 216, and the directional polarizers 222, 224 can be positioned in the downhole environment. The light source and the photodetectors 226, 228 can be positioned at a remote location or elsewhere in the well system (e.g., at the surface 108 of the wellbore in FIG. 1).

The optical fiber 202 can guide light from the light source downhole into the downhole environment. The optical fibers 204, 206 can form a path for polarized light to travel up-hole, from the directional polarizers 222, 224, out of the downhole environment. As an example, the optical fiber 204 can guide polarized light passing through the directional polarizer 222 to the photodetector 226 positioned at the surface of the wellbore. The optical fiber 206 can guide polarized light passing through the directional polarizer 224 to the photodetector 228 positioned at the surface of the wellbore.

The photodetectors 226, 228 can each be communicatively coupled to the computing device 124. The computing device 124 may transmit to and receive data from the photodetectors 226, 228. The photodetectors 226, 228 can each transmit an electrical signal or data to the computing device 124 via a wired or wireless link. The electrical signal may represent data about an amount of polarization of polarized light. For example, the photodetector 226 can transmit an electrical signal 230 to the computing device 124. The electrical signal 230 may represent a state of polarization of light in the light path 218. The photodetector 228 can transmit another electrical signal 232 to the computing device 124. The other electrical signal 232 may represent a state of polarization of light in the light path 220. In some examples, the computing device 124 may receive other data. The other data may represent a polarization state of a light beam (e.g., the light beam 300) prior to the light beam traversing the substrate. In some examples, the other data my represent the reference polarization angle of the light beam after the light beam passes through the reference polarizer 213.

In some examples, the components of the analyte sensor 118 shown in FIG. 2 can be integrated into a single structure. For example, the components can be within a single housing or chassis. As an example, the splitter 216 and the directional polarizers 222, 224 can be integrated into a single polarizing splitter. The polarizing splitter can divide the light beam to form light paths 218, 220. The polarizing splitter can also polarize light in each light path 218, 220 to form polarized light beams. In some examples when a splitter and directional polarizers are integrated into a single polarizing splitter, polarizers 222, 224 may not be included in the analyte sensor 118. As another example, either polarizer 222 or 224 may be omitted. A single polarizer can polarize light in either light path 218 or 220 while the light in the other path remains unpolarized. In some examples where the analyte sensor includes a single polarizer, an optical fiber can form a path for unpolarized light to travel up-hole (e.g., to another polarizer, a photodetector, or another component of the analyte sensor). In other examples, the components shown in FIG. 2 can be distributed (e.g., in separate housings).

Figure 3:
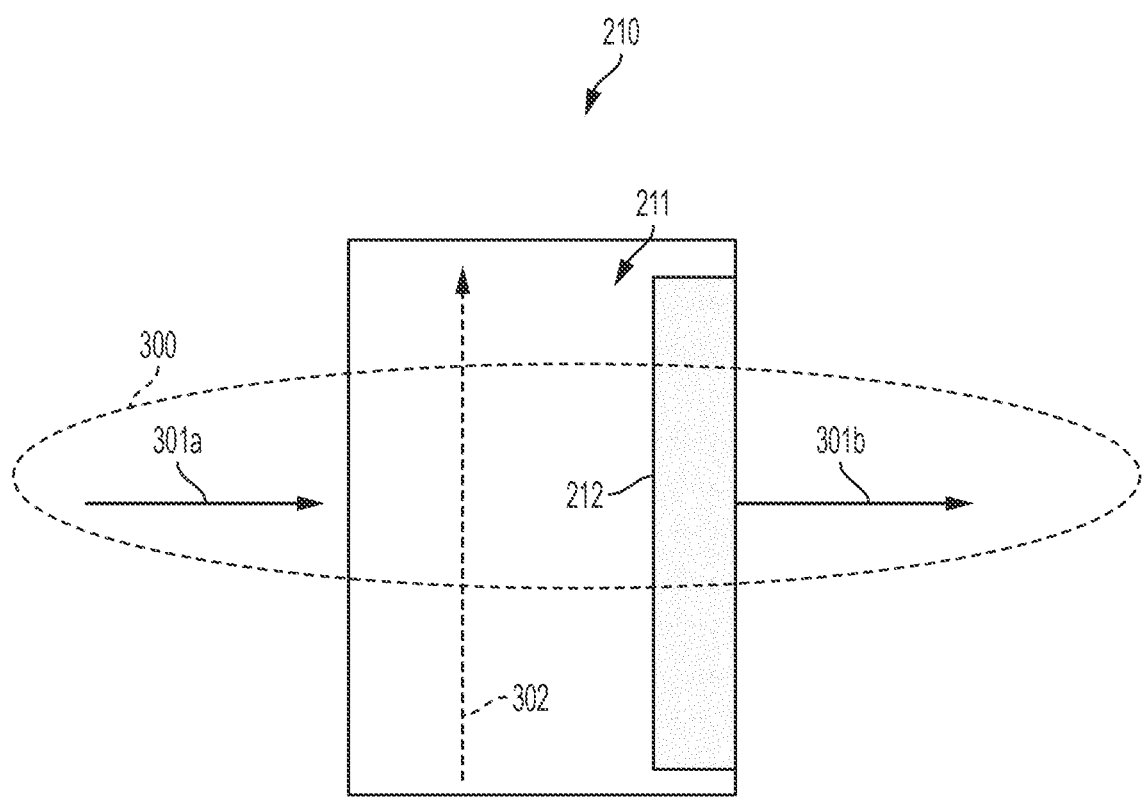
FIG. 3 is a schematic diagram of an example of a light beam traversing a substrate that is in a sample chamber according to one example of the present disclosure.

In some examples, the presence, type, or amount of an analyte in fluid can be determined based on a change in a polarization state of light as the light travels through the analyte sensor 118. For example, FIG. 3 is a schematic diagram of an example of a light beam 300 traversing a substrate 212 that is in a sample chamber 210, according to one example.

The light beam 300 can be provided by a light source (e.g., the light source 122 in FIG. 1). The light beam 300 can include an entering light beam 301a and an exiting light beam 301b. The entering light beam 301a may represent the light beam 300 before the light beam 300 enters the sample chamber 210 or before the light beam 300 traverses the substrate 212. The exiting light beam 301b may represent the light beam 300 after the light beam 300 traverses the substrate 212.

The entering light beam 301a can traverse the sample chamber 210. The sample chamber may include the channel 211. The channel 211 may allow a fluid sample or fluid 302 to flow through the sample chamber 210. In some examples, the fluid 302 can be any fluid. For example, the fluid 302 can be fluid from a wellbore (e.g., fluid from the wellbore 102). The fluid 302 may contain an analyte (e.g., a chemical or substance). As an example, the fluid can include a hydrocarbon. In another example, the fluid 302 can be a mixture of oil and water (e.g., from the wellbore 102 in FIG. 1).

The sample chamber 210 can include the substrate 212. The substrate 212 can include a chiral molecule. The chiral molecule may be on, embedded in, or anchored to the substrate 212. The entering light beam 301a can traverse the fluid 302, the substrate 212, and the chiral molecule, as the entering light beam 301a passes through the sample chamber 210.

In some examples, the chiral molecule on the substrate 212 may be a sensing molecule. For example, the chiral molecule may sense (e.g., detect a presence) of an analyte in the fluid 302. In some examples, the chiral molecule may sense the presence of a particular analyte in the fluid 302. In some examples, a plurality of chiral molecules may be used to detect or distinguish between various chemicals, solvents, metal concentration (e.g., $Mg^{2+}$, $Ca^{2+}$, $Fe^{2+}$, $K^+$, etc.), water content and halide concentration (e.g., $F^{1-}$, $Cl^{1-}$, $Br^{1-}$, etc.) In some examples, the chiral molecule may sense the presence of a particular analyte depending on various factors including, for example, a polymer backbone of the chiral molecule or an attached ligand.

Figure 4A:
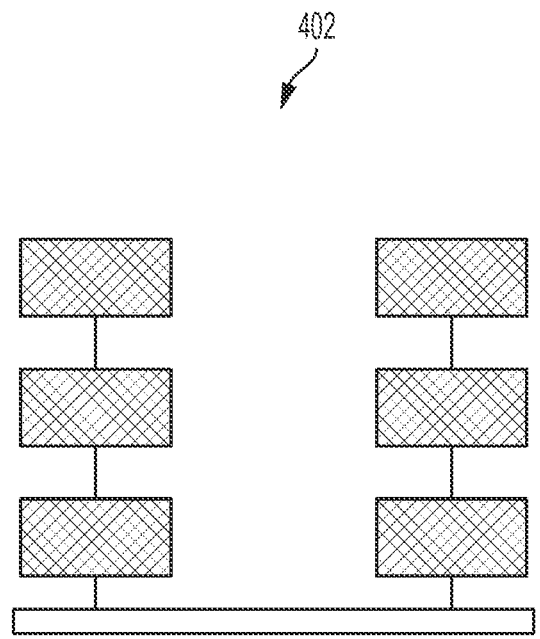
FIG. 4A is a schematic diagram showing an initial orientation of chiral molecules in the absence of an analyte according to one example of the present disclosure.
Figure 4B:
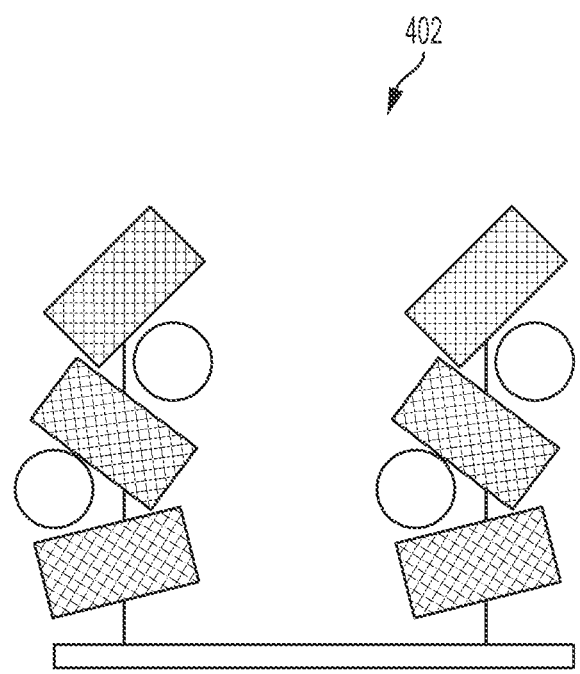
FIG. 4B is a schematic showing a change in orientation of the chiral molecules of FIG. 4A in the presence of an analyte according to one example of the present disclosure.

The chiral molecule may interact with the fluid 302 as the fluid 302 flows through the sample chamber 210, which can cause a change in a property of the chiral molecule in response to a presence, type, or amount of the analyte. For example, a chiroptical property of the chiral molecule may change in response to the presence of the analyte. In another example, optical activity of the chiral molecule may change in response to the presence of the analyte. In still another example, a position, orientation, rotation, or helicity of the chiral molecule may change in response to the presence of the analyte. As an example, FIG. 4A is a schematic diagram showing an initial orientation of chiral molecules 402 in the absence of an analyte, according to one example. In some examples, chiral molecules 402 may have an initial or first orientation, as depicted in FIG. 4A. The chiral molecules 402 may sense the presence of an analyte in a fluid (e.g., in the fluid 302 in FIG. 3). Sensing the presence of the analyte may cause a change in the orientation of the chiral molecules 402. For example, FIG. 4B is a schematic showing a change in orientation of the chiral molecules 402 of FIG. 4A in the presence of an analyte. In some examples, the presence of an analyte may cause a change in the orientation of the chiral molecules 402, which can cause the chiral molecules to have a different or second orientation, as depicted in FIG. 4B.

Figure 5A:
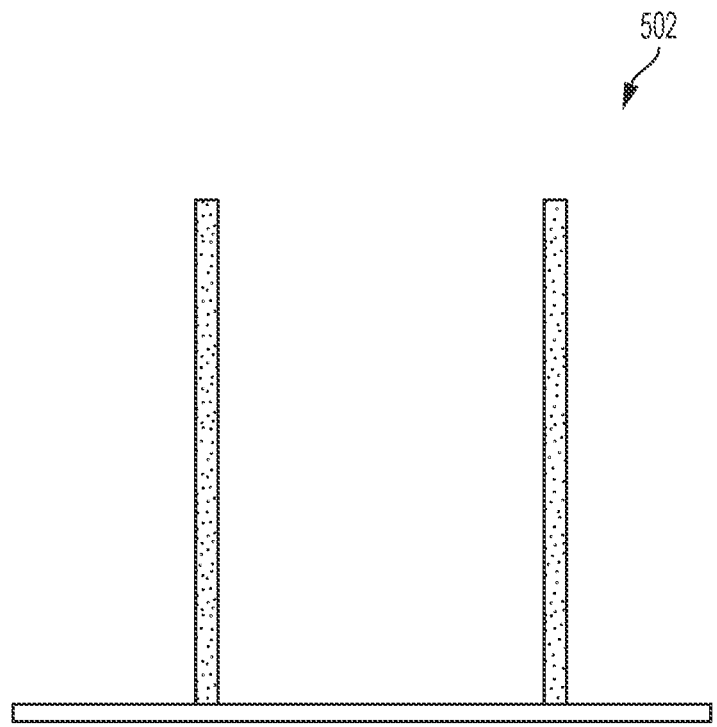
FIG. 5A is a schematic diagram showing an initial orientation of chiral molecules in the absence of an analyte according to another example of the present disclosure.
Figure 5B:
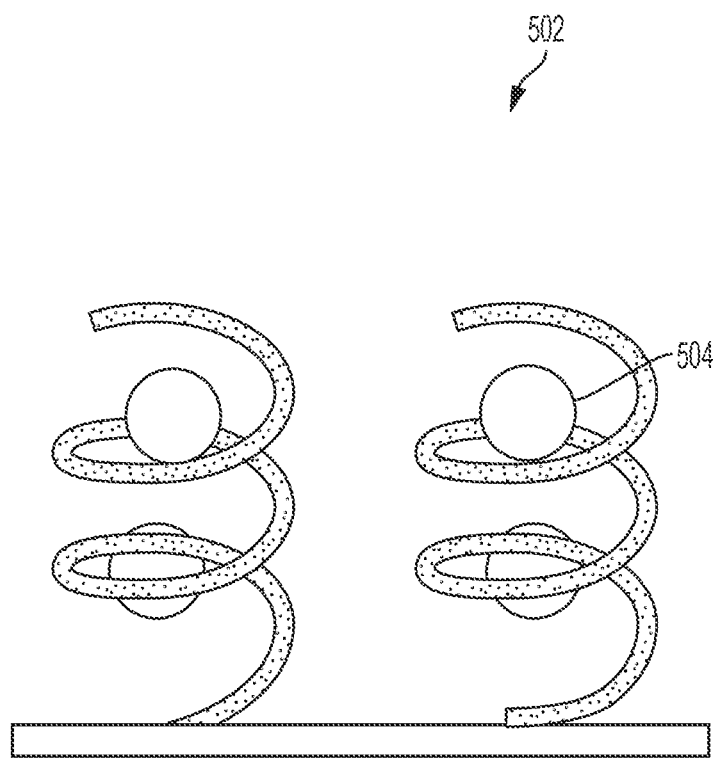
FIG. 5B is a schematic showing a change in orientation of the chiral molecules of FIG. 5A in the presence of an analyte according to one example of the present disclosure.

FIG. 5A is a schematic diagram showing an initial orientation of chiral molecules 502 in the absence of an analyte, according to another example. In some examples, the chiral molecules 502 may have an initial or first orientation, as depicted in FIG. 5A. The chiral molecules 502 may sense the presence of an analyte, which can cause a change in the orientation of the chiral molecules 502. For example, FIG. 5B is a schematic diagram showing a change in orientation of the chiral molecules 502 of FIG. 5A in the presence of an analyte. In the example depicted in FIG. 5B, the chiral molecules 502 can include a chiroptical molecule element 504 between the chiral molecule 502.

Returning to FIG. 3, in some examples, the change in the property of the chiral molecule in response to the presence, type and amount of the analyte may cause a change in a polarization state (e.g., polarization angle) of the entering light beam 301a as the entering light beam 301a traverses the substrate 212. For example, the entering light beam 301a may have an entering polarization angle before traversing the substrate 212 (e.g., the reference polarization angle from polarizing the light beam using the reference polarizer 213). The change in the property of the chiral molecule may cause the exiting light beam 301b to have an exiting polarization angle after traversing the substrate 212. In some examples, the entering polarization angle of the entering light beam 301a may be different from the exiting polarization angle of the exiting light beam 301b. In some examples, a presence, amount, or type of an analyte in the fluid 302 can be determined based on the entering polarization angle of the entering light beam 301a and the exiting polarization angle of the exiting light beam 301b. For example, the presence, amount, or type of the analyte can be determined by comparing the entering polarization angle of the entering light beam 301a to the exiting polarization angle of the exiting light beam 301b.

Figure 6:
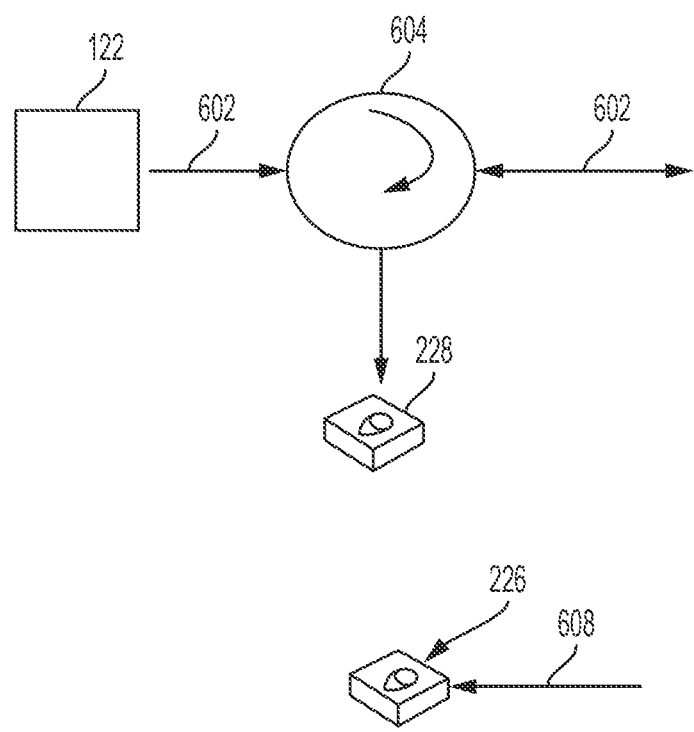
FIG. 6 is a schematic diagram showing a surface view of an example of an analyte sensor, along with optical fibers, which can be used in a well system according to one example of the present disclosure.

In some examples multiple optical fibers can be used with an analyte sensor to determine the presence, type, or amount of an analyte in fluid. For example, FIG. 6 is a schematic diagram showing a surface view of an example of an analyte sensor 118, along with optical fibers 602, 608, which can be used in a well system.

In some examples, a well system (e.g., the well system 100 in FIG. 1) can include a light source 122, a circulator 604, an analyte sensor (e.g., the analyte sensor 118 in FIG. 2) and optical fibers 602, 608.

The light source 122 can provide or generate a light beam. The light source 122 can be positioned at a surface of the well system (e.g., at the surface 108 in FIG. 1). A component of the analyte sensor can be positioned within a wellbore in the well system (e.g., the wellbore 102) or at the surface of the well system.

An optical fiber 602 can be coupled to the light source 122 for forming a path for the light from the light source 122 at the surface toward a component of the analyte sensor (e.g., the reference polarizer 213, the sample chamber 210, the splitter 216, or the directional polarizers 222, 224) positioned within the wellbore.

A circulator 604 can be positioned at the surface of the well system and between the optical fiber 602 and the component of the analyte sensor positioned within the wellbore. The circulator 604 can be any device that can control a direction of flow of light or an electrical signal. As an example, the circulator 604 can be an optical circulator. In some examples, the optical fiber 602 can be routed to the circulator 604. Routing the optical fiber 602 to the circulator 604 may allow the optical fiber 602 to direct the light from the light source 122 into the wellbore toward the component of the analyte sensor positioned within the wellbore. Routing the optical fiber 602 to the circulator 604 may also allow the optical fiber 602 to direct a polarized light from within the wellbore (e.g., polarized light from directional polarizers 222, 224 within the wellbore) to the surface of the wellbore. In some examples, the circulator 604 may also be coupled to a component of the analyte sensor positioned at the surface of the wellbore (e.g., the photodetector 228). In the example depicted in FIG. 6, coupling the circulator 604 to the photodetector 228 may allow the photodetector 228 to receive a polarized light from the wellbore (e.g., receive a polarized light from directional polarizer 224).

In some examples, another component of the analyte sensor can be positioned at the surface of the wellbore. In the example depicted in FIG. 6, the photodetector 226 can be positioned at the surface of the wellbore. The photodetector 226 may receive polarized light from the wellbore via the optical fiber 608. For example, the optical fiber 608 can guide a polarized light from a directional polarizer in the wellbore (e.g., the directional polarizer 222) to the photodetector 226 at the surface of the wellbore.

Figure 7:
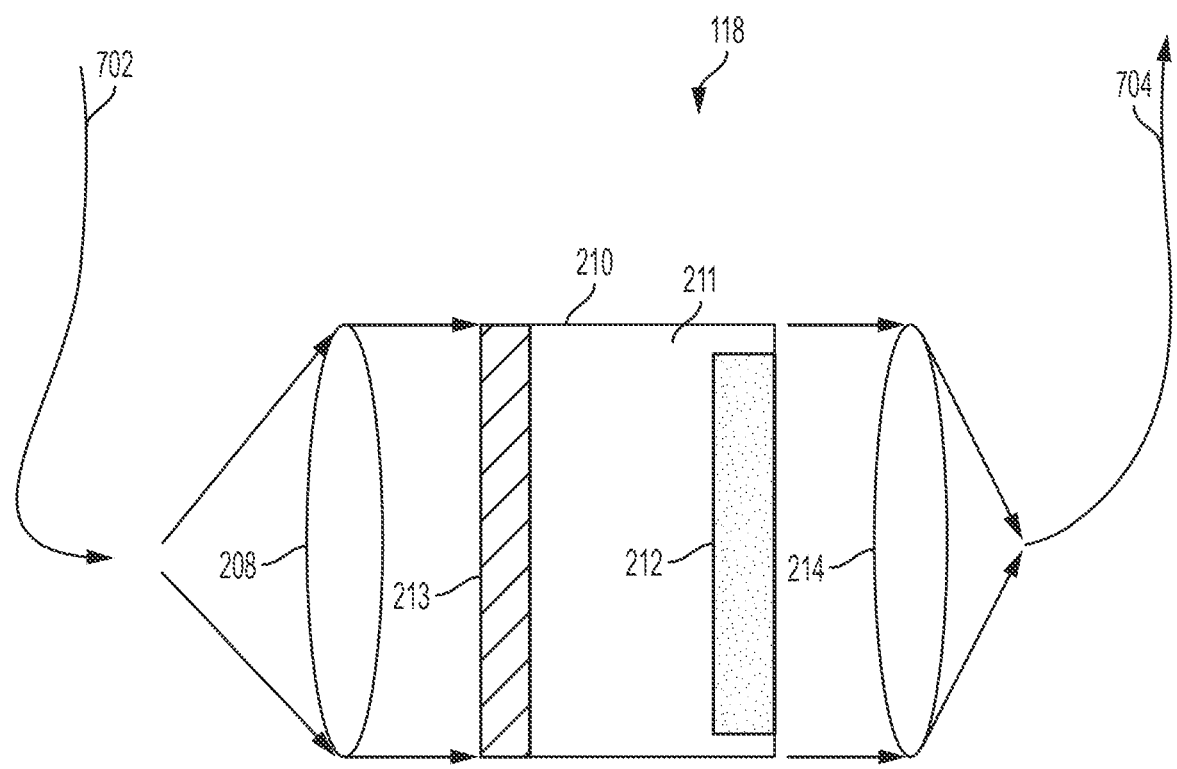
FIG. 7 is a schematic diagram showing a downhole view of an example of an analyte sensor, along with optical fibers, which can be used in a well system according to another example of the present disclosure.

FIG. 7 is a schematic diagram showing a downhole view of an example of an analyte sensor 118, along with optical fibers 702, 704, which can be used in a well system, according to another example.

In some examples, components of the analyte sensor, can be positioned within a wellbore (e.g., the wellbore 102 in FIG. 1) or proximate to a surface of the wellbore (e.g., the surface 108 in FIG. 1). For example, in the example depicted in FIG. 7, the collimators 208, 214, the reference polarizer 213, and the sample chamber 210 can be positioned within the wellbore. A light source (e.g., the light source 122), a splitter (e.g., the splitter 216), directional polarizers (e.g., the directional polarizers 222, 224), and photodetectors (e.g., the photodetectors 226, 228) can be positioned near the surface of the wellbore. In some examples, an optical fiber 702 can be coupled to the light source for guiding light from the light source at the surface toward components of the analyte sensor 118 in the wellbore (e.g., toward the sample chamber 210). An optical fiber 704 can be coupled to the collimator 214 for guiding light from the collimator 214 to the splitter after the light passes through the substrate 212 and the collimator 214. The optical fiber 704 can be a polarization maintaining optical fiber. In some examples, positioning components of the analyte sensor 118 (e.g., the splitter 216, the directional polarizers 222, 224, or the photodetectors 226, 228) at the surface of the wellbore can be advantageous over positioning the components elsewhere in a well system, such as within the wellbore. For example, positioning the components at the surface of the wellbore can reduce an amount of Rayleigh backscatter from the light source that can be detected by the photodetectors 226, 228.

Figure 8:
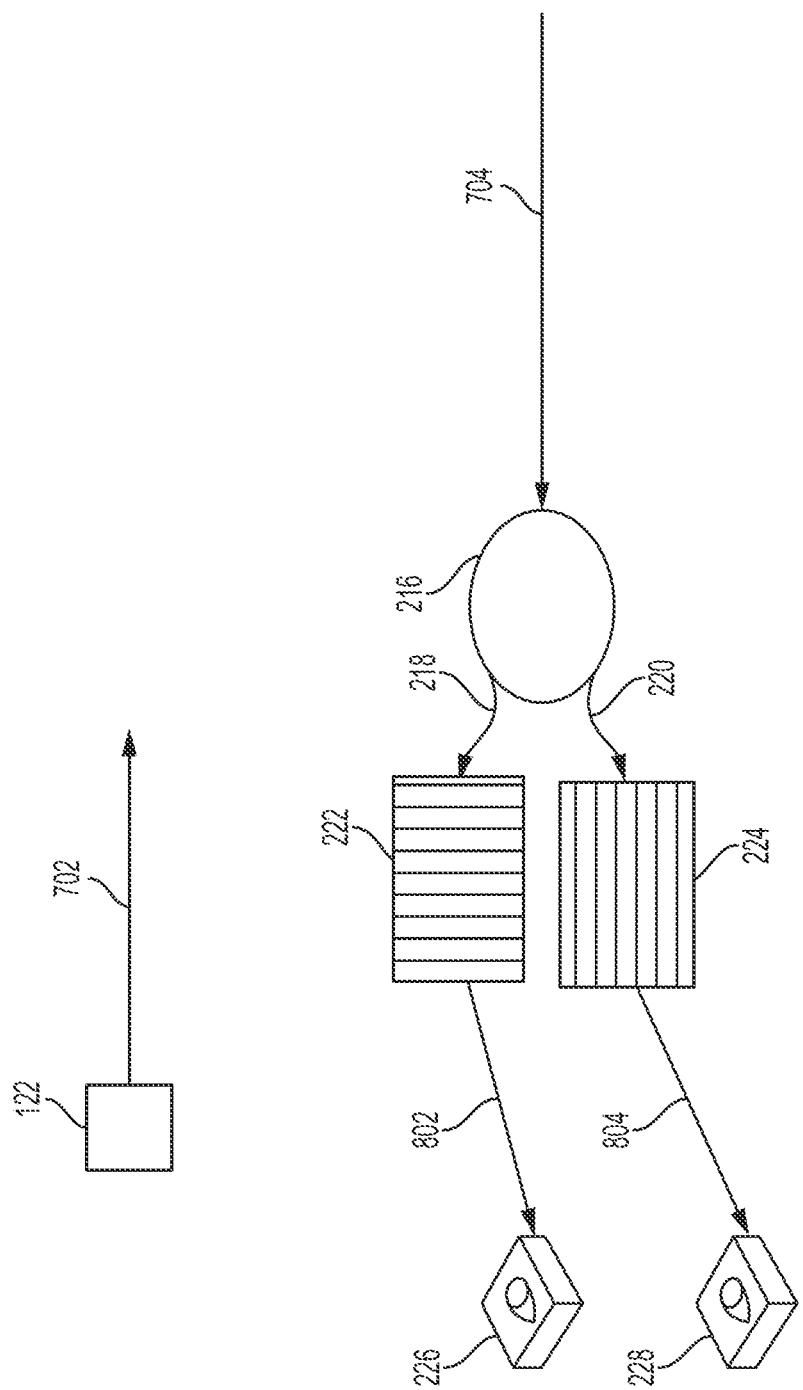
FIG. 8 is a schematic diagram showing a surface view of the example of FIG. 7 according to one example of the present disclosure.

FIG. 8 a schematic diagram showing a surface view of the example of FIG. 7. In the example shown in FIG. 8, the light source 122 can be positioned near the surface of the wellbore. The optical fiber 702 can be coupled to the light source for guiding light from the light source at the surface toward the components of the analyte sensor 118 in the wellbore. The polarization maintaining optical fiber 704 can be coupled to the collimator 214 in the wellbore for guiding the light from the collimator to the splitter 216 after the light beam passes through the substrate 212 and the collimator 214. The splitter 216 can divide the light into light paths 218, 220. The directional polarizers 222, 224 can polarize light in the light paths 218, 220. The photodetectors 226, 228 can be positioned near the directional polarizers 222,224 for converting polarized lights 802, 804, exiting the directional polarizers 222, 224 into electrical signals.

Figure 9:
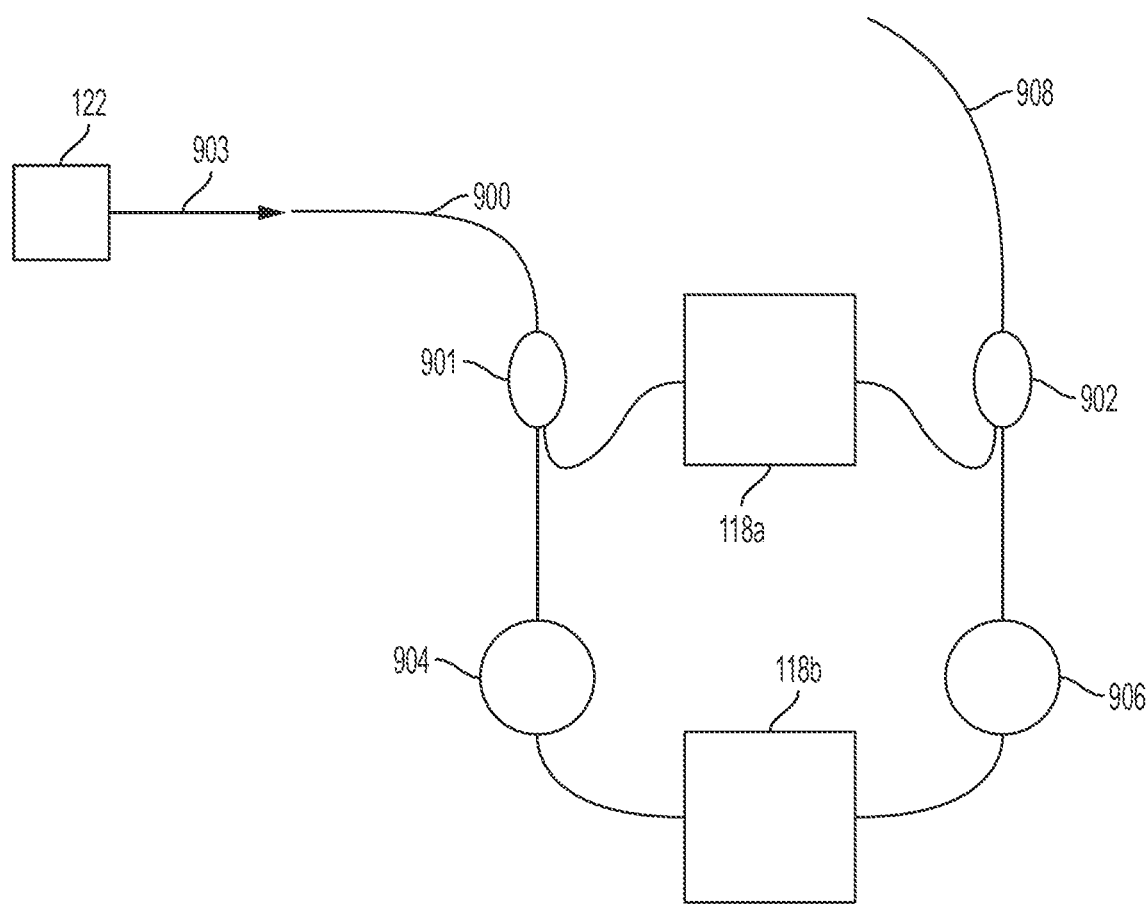
FIG. 9 is a schematic diagram showing an example of analyte sensors and a plurality of optical fibers, which can be used in a well system according to another example of the present disclosure.

In some examples, multiple analyte sensors can be multiplexed or incorporated into a system for determining the presence, type, or quantity of an analyte in a fluid. For example, FIG. 9 is a schematic diagram showing an example of analyte sensors 118a-b and a plurality of optical fibers, which can be used in a well system, according to another example.

In some examples, analyte sensors 118a-b can be positioned in a well system. Each analyte sensor 118a-b can be configured in substantially the same manner as analyte sensor 118 discussed above with respect to FIGS. 2-8. The analyte sensors 118a-b may be coupled together via optical fibers or couplers 901, 902.

In some examples, a light source 122 can provide light 903. An optical fiber 900 can guide the light 903 from the light source 122 into a wellbore in the well system (e.g., the wellbore 102) and toward the analyte sensors 118a-b. The coupler 901 may cause the light 903 to split or divide. Dividing the light 903 may allow a portion of the light 903 to travel through each of the analyte sensors 118a-b. The portion of the light 903 that travels through each analyte sensor 118a-b can travel through the analyte sensor in a manner substantially the same as described above with respect to FIGS. 2-8. In some examples, a distance between the analyte sensor 118a and the analyte sensor 118b may delay a corresponding portion of the light 300 from entering or exiting the analyte sensors 118a-b. In another example, delay coils 904, 906 may delay a portion of the light 903 from entering or exiting the analyte sensors 118a-b. As an example, the delay coil 904 may delay light 903, or a portion of light 903, from reaching the analyte sensor 118b. Delaying a portion of the light 903, from reaching the analyte sensor 118b may allow a first portion of the light 903 to enter and travel through analyte sensor 118a before another portion of the light 903 enters and travels through the analyte sensor 118b. As another example, the delay coil 906 may delay a portion of the light 903 from exiting the analyte sensor 118b. Delaying a portion of the light 903, from exiting the analyte sensor 118b may delay the portion of the light 903 from reaching photodetectors for converting the portion of light 903 into an electrical signal. In some examples, if the analyte sensors 118a-b are positioned with sufficient distance between the analyte sensors 118a-b and the analyte sensors 118a-b are coupled via sufficient optical fibers, the delay coils 904, 906 may be omitted.

In some examples, the analyte sensors 118a-b may be located at different positions in the well system. In another example, the analyte sensors 118a-b may be located at the same position in the well system. In some examples, each analyte sensor 118a-b may be used to detect a presence, type, or amount of the same analyte in a fluid. In another example, each analyte sensor 118a-b may be used to detect a presence, type, or amount of a different analyte in a fluid.

An optical fiber 908 can guide light from the analyte sensors 118a-b in the wellbore to the surface of the wellbore.

Figure 10:
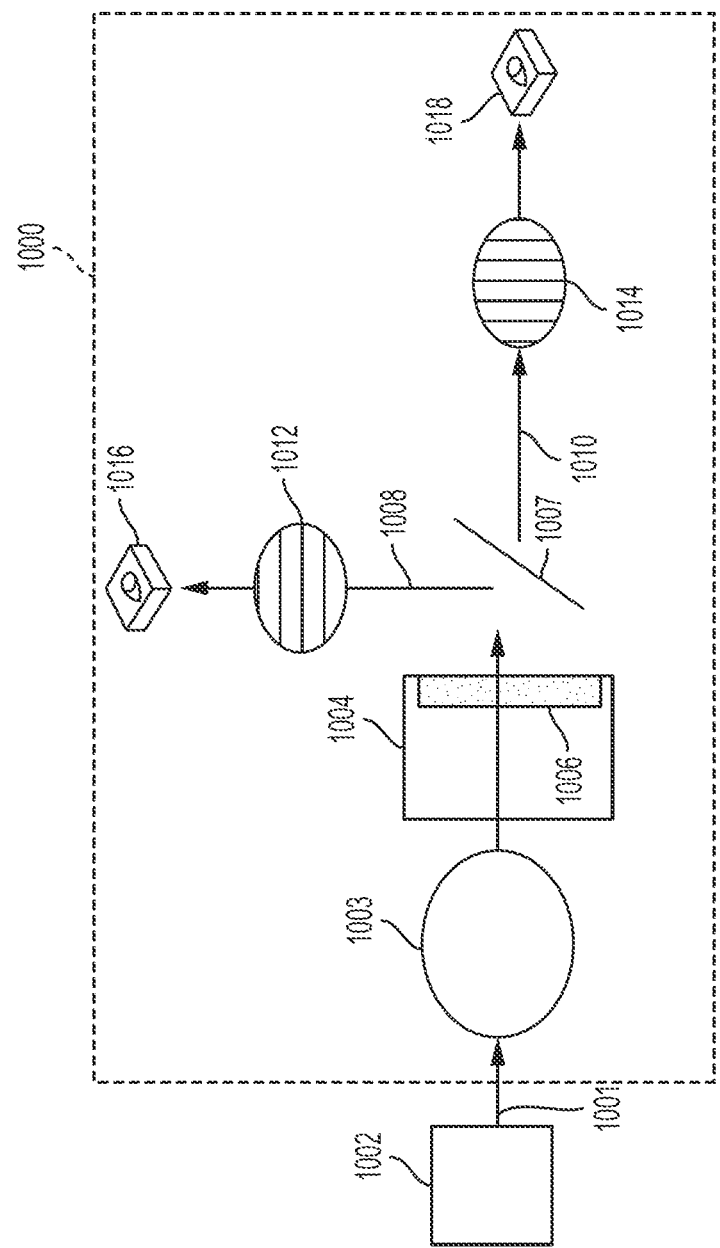
FIG. 10 is a schematic diagram of an example of an analyte sensor and a light source that can be used in free-space for determining the presence, type, or amount of an analyte in fluid according to another example of the present disclosure.

In some examples, an analyte sensor may be used without optical fibers or in free-space. For example, FIG. 10 is a schematic diagram of an example of an analyte sensor 1000 and a light source 1002 that can be used in free-space for determining the presence, type, or amount of an analyte in fluid, according to another example.

A light source 1002 can provide a light beam 1001. An analyte sensor 1000 can include a reference polarizer 1003. The reference polarizer 1003 can be substantially the same as reference polarizer 213 of FIG. 2. The light beam 1001 can travel through the reference polarizer 1003. The reference polarizer 1003 can cause the light beam 1001 to have a reference polarization angle. In some examples, if the light beam 1001 entering the sample chamber 1004 is unpolarized, the reference polarizer 1003 can be omitted from analyte sensor 1000.

The analyte sensor 1000 can also include a substrate 1006 in a sample chamber 1004. The substrate 1006 can include chiral molecules. The substrate 1006 can be substantially the same as substrate 212 of FIG. 2. The sample chamber 1004 can include a fluid sample. The sample chamber 1004 can be substantially the same as the sample chamber 210 of FIG. 2. Chiral molecules in the substrate 1006 may sense a presence of an analyte in the fluid sample in the sample chamber 1004. A property of each of the chiral molecules may change in response to the chiral molecules sensing the presence of the analyte. The change in property of each of the chiral molecules may cause a change in polarization angle of the light beam 1001 as the light beam 1001 travels through the sample chamber 1004 and traverses the substrate 1006.

The analyte sensor 1000 may also include a splitter 1007. The splitter 1007 can be substantially the same as the splitter 216 of FIG. 2. The splitter 1007 may divide the light beam 1001 into multiple light paths. In the example depicted in FIG. 10, the splitter 1007 may divide the light beam 1001 into light paths 1008, 1010.

The analyte sensor 1000 may also include directional polarizers 1012, 1014. The directional polarizers 1012, 1014 can be substantially the same as directional polarizers 222, 224 of FIG. 2. In the example depicted in FIG. 10, directional polarizer 1012 can be horizontal polarizer. The directional polarizer 1014 can be a vertical polarizer. In some examples, the directional polarizers 1012, 1014 may be positioned near light paths 1008, 1010 for polarizing light in the light paths 1008, 1010. For example, the directional polarizer 1012 may be positioned near the light path 1008 for polarizing light in the light path 1008 to form a first polarized light beam. The directional polarizer 1014 may be positioned near the light path 1010 for polarizing light in light path 1010 to form a second polarized light beam. As described with respect to FIG. 2, in some examples the splitter 216 and the directional polarizers 222, 224 can be integrated into a single housing or device (e.g., a polarizing splitter). In such examples, the either the directional polarizer 222 or the directional polarizer 224 may not be included in the analyte sensor 1000. The single polarizer can polarize light in either light path 1008 or 1010 while the other light path remains unpolarized.

The analyte sensor 1000 may also include photodetectors 1016, 1018. Photodetectors 1016, 1018 can be substantially the same as photodetectors 226, 228 of FIG. 2. In the example depicted in FIG. 10, the photodetector 1016 can be a horizontal photodetector. The photodetector 1018 can be a vertical photodetector. In some examples, the photodetectors 1016, 1018 may be positioned near light paths 1008, 1010. For example, the photodetector 1016 can be positioned near the light path 1008 for detecting the first polarized light beam in the light path 1008. The photodetector 1018 can be positioned near the light path 1010 for detecting the second polarized light beam in the light path 1010. Each of the photodetectors 1016, 1018 can convert a detected polarized light beam into an electrical signal that indicates an amount of polarization of the detected polarized light beam. The photodetectors 1016, 1018 can be communicatively coupled to a computing device for determining a presence, type, or amount of an analyte in a fluid.

Figure 11:
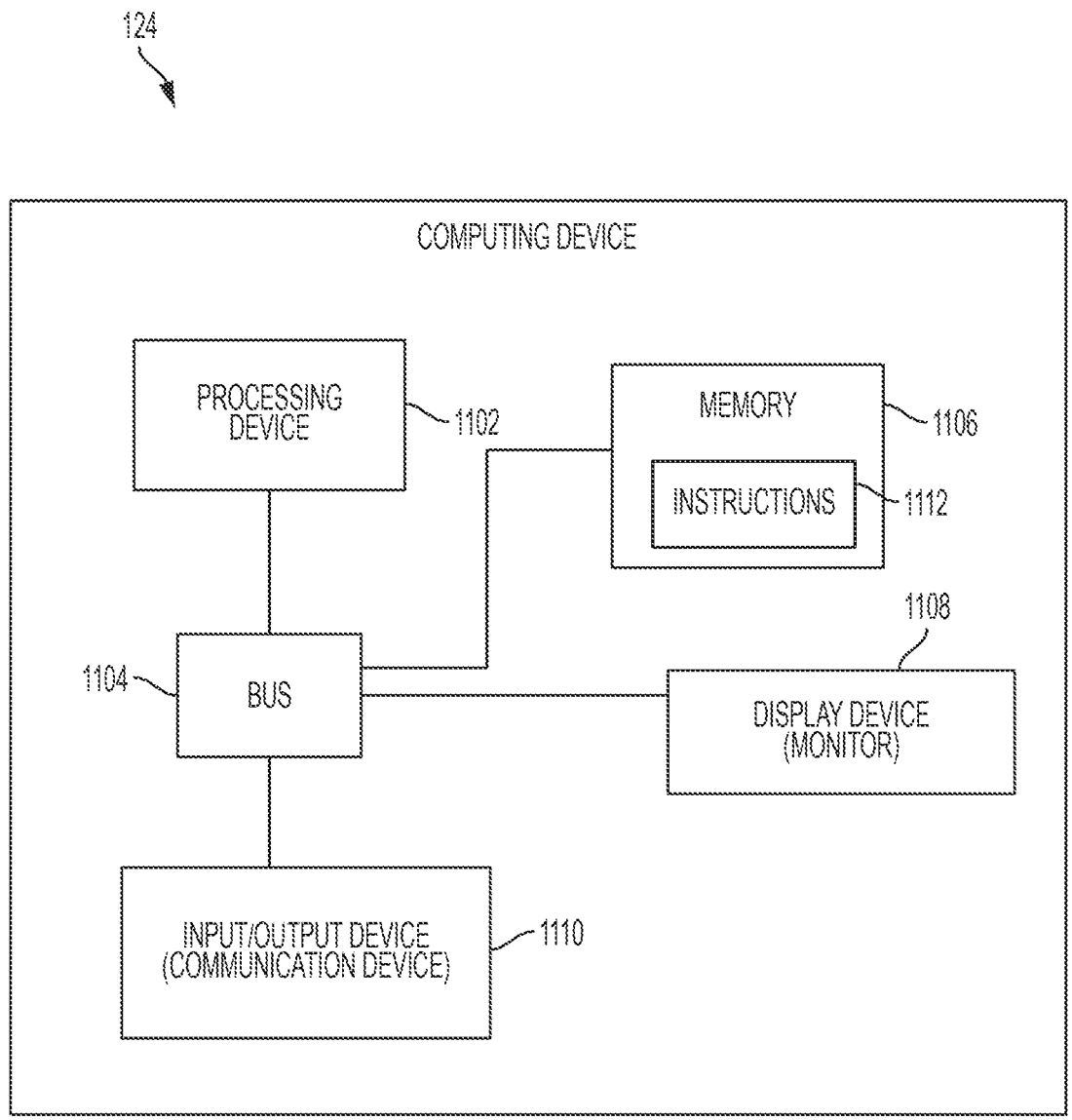
FIG. 11 is a block diagram of an example of a computing device for determining a presence, type, or amount of an analyte in a fluid according to one example of the present disclosure.

FIG. 11 is a block diagram of an example of a computing device 124 for determining a presence, type, or amount of an analyte in a fluid, according to one example.

The computing device 124 can include a processing device 1102 interfaced with other hardware via a bus 1104. The computing device 124 may also include a memory device 1106. In some examples, the computing device 124 can include input/output interface components (e.g., a display device 1108, a communication device 1110, etc.) The computing device 124 can also include other input/output interface components such as a keyboard, touch-sensitive surface, mouse and additional storage.

The computing device 124 can receive electrical signals or data from a photodetector via communication device 1110. In other examples the computing device 124 can receive other data via communication device 1110 (e.g., data from a remote location). In some examples, the communication device 1110 can represent one or more of any components that facilitate a network connection. In some examples, the communication device 1110 may be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In another example, the communication device 1110 can be wired and can include interfaces such as Ethernet, USB, IEEE 1394, or a fiber optic interface.

The computing device 124 can be communicatively coupled to the memory device 1106 via the bus 1104. The non-volatile memory device 1106 may include any type of memory that retains stored information when powered off. Non-limiting examples of the memory device 1106 include EEPROM, flash memory, or any other type of non-volatile memory. In some examples, at least some of the memory device 1106 can include a medium from which the processing device can read instructions 1112. A computer-readable medium can include electronic, optical, magnetic, or other storage devices capable of providing the processing device 1102 with computer-readable instructions or other program code. Non-limiting examples of a computer-readable medium include, but are not limited to, magnetic disks, memory chips, read-only memory ("ROM"), random-access memory ("RAM"), an ASIC, a configured processor, optical storage, or any other medium from which a computer processor can read instructions.

In some examples, the memory device 1106 can include instructions 1112 for receiving an electrical signal (e.g., from a photodetector or from another computing device) or indicia of a user input (e.g., if the user programs the computing device 124) that may correspond to a state of polarization of light, an amount of polarization of polarized light, or a reference polarization angle of light.

The processing device 1102 can include one processing device or multiple processing devices. The processing device 1102 can execute one or more operations for determining a presence, type, or amount of an analyte in a fluid. For example, the processing device 1102 can execute an operation for comparing an amount of polarization of a first polarized light in a first light path (e.g., the amount of polarization of a polarized light in light path 218 of FIG. 2) and an amount of polarization of a second polarized light in another light path (e.g., the amount of polarization of a polarized light in the light path 220 of FIG. 2). The processing device 1102 can execute operations for using the comparison to determine a ratio of the amount of polarization of the first polarized light to the amount of polarization of the second polarized light. In another example, the processing device 1102 can execute an operation for comparing: i) a reference polarization angle of light; ii) the amount of polarization of the first polarized light; and iii) the amount of polarization of the second polarized light for determining a presence, amount, or type of an analyte in a fluid.

The processing device 1102 can also execute one or more operations for outputting data for determining a presence, type, or amount of an analyte in a fluid. In some examples, the data may correspond to: i) the reference polarization angle of the light; ii) the amount of polarization of the first polarized light; or iii) the amount of polarization of the second polarized light.

Figure 12:
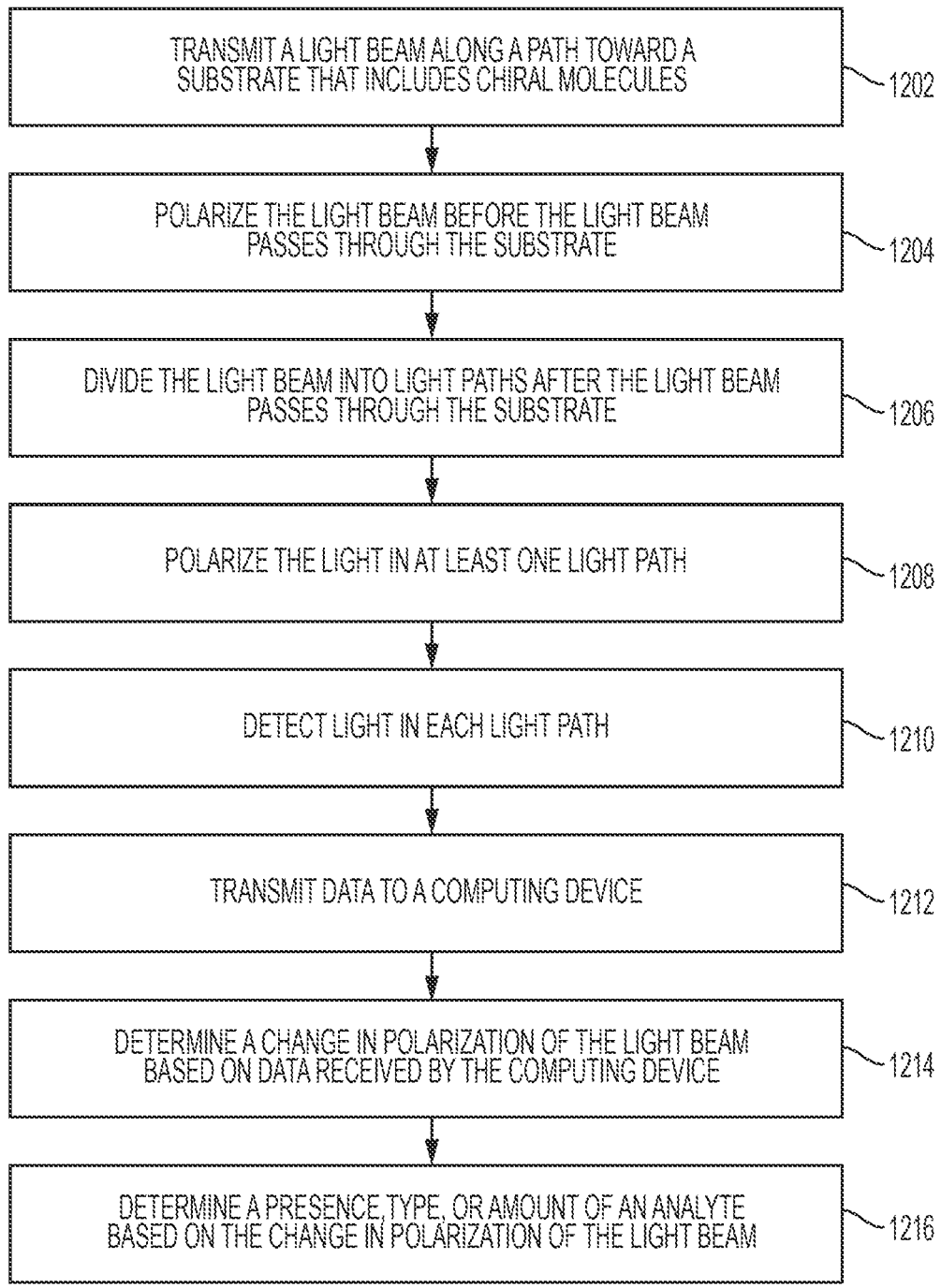
FIG. 12 is a flow chart of an example of a process for determining a presence, type, or amount of an analyte in a fluid according to one example of the present disclosure.

FIG. 12 is a flow chart of an example of a process for determining a presence, type, or amount of an analyte in a fluid.

In block 1202, a light beam is transmitted along a path toward a substrate that includes chiral molecules. In some examples, a light source can provide the light beam. In some examples, an optical fiber can be coupled to the light source. The optical fiber can form a path for the light to travel from the light source toward the substrate. The substrate, along with the chiral molecules, can be in a sample chamber. The chiral molecules can each sense the presence of an analyte in a fluid sample in the sample chamber. A property (e.g., optical activity, chiroptical property, a position, orientation, rotation, or helicity) of each of the chiral molecules may change in response to the chiral molecule sensing the presence of the analyte. In some examples, the change in the property of the chiral molecules may cause a change in polarization of the light beam as the light beam travels through the substrate.

In block 1204, the light beam is polarized before the light beam passes through the substrate. In some examples, a reference polarizer (e.g., the reference polarizer 213 of FIG. 2) can polarize the light beam. The reference polarizer can be any device for polarizing light. The reference polarizer can be positioned in the path of the light beam (e.g., between the light source and the substrate). The reference polarizer can normalize the polarization state of the light beam before the light beam traverses the substrate. In some examples, normalizing the light beam can cause the light beam to have a reference polarization angle. The reference polarization angle can represent a polarization angle of the light beam before the light beam enters the sample chamber. In some examples, light beam can be transmitted through the reference polarizer to the sample chamber. In some examples, the process for determining a presence, type, or amount of an analyte in a fluid may not include block 1204. For example, if the light beam entering the sample chamber is unpolarized, the reference polarizer can be omitted.

In block 1206, the light beam is divided into light paths after the light beam passes through the substrate. In some examples, a splitter (e.g., the splitter 216 of FIG. 2) can divide the light beam. The splitter can be positioned in the path of the light beam (e.g., near the substrate or sample chamber) for dividing the light beam after the light beam passes through the substrate. The splitter can divide the light beam into various light-paths (e.g., light paths 218, 220 of FIG. 2). For example, the splitter can divide the light beam into a first light path and a second light path. Each light path can include light (e.g., a portion of the light beam).

In block 1208, light in at least one path is polarized. In some examples, a directional polarizer (e.g., directional polarizers 222, 224 of FIG. 2) can polarize light in a light path. The directional polarizer can be positioned in a light path formed by dividing the light beam. The directional polarizer can polarize light in the light path to form a polarized light. As an example, the directional polarizer can be a horizontal polarizer. The horizontal polarizer can polarize light in a light path and form horizontal polarized light. In some examples, another directional polarizer can be positioned in another light path formed by dividing the light beam. The other directional polarizer can polarize light in the other light path to form another polarized light beam. As an example, the other directional polarizer can be a vertical polarizer. The vertical polarizer can polarize light in the other light path to form vertical polarized light.

In block 1210, light in each light path is detected. In some examples, light in each light path can be detected by a photodetector (e.g., photodetectors 226, 228 of FIG. 2). The photodetector can be positioned in a light path for detecting the polarized light in the light path. The photodetector can detect the polarized light and convert the detected polarized light into an electrical signal. The electrical signal can indicate an amount of polarization of the polarized light. In some examples, multiple photodetectors can detect polarized light in multiple light paths and convert each detected polarized light into a corresponding electrical signal. As an example, a photodetector can detect a first polarized light (e.g., the horizontal polarized light of block 1208) and convert the first polarized light into a first electrical signal indicating an amount of the first polarized light. Another photodetector can detect a second polarized light (e.g., the vertical polarized light of block 1208) and convert the detected second polarized light into a second electrical signal indicating an amount of the detected second polarized light.

In block 1212, data is transmitted to a computing device. In some examples, the computing device can receive data from a photodetector. The computing device can be communicatively coupled to the photodetector for receiving an electrical signal from the photodetector. The computing device can receive data corresponding to a state of polarization of light detected by the photodetector. In another example, the data can correspond to an amount of polarization of a polarized light detected by the photodetector. In some examples, the computing device can receive multiple electrical signals from multiple photodetectors. The multiple electrical signals can indicate an amount of polarization of polarized light detected by each of the multiple photodetectors. As an example, the computing device can receive the first electrical signal from the photodetector in block 1210. The computing device can also receive the second electrical signal from the other photodetector in block 1210. The computing device can also receive other data (e.g., from another computing device). The other data can correspond to a polarization angle of a light beam (e.g., the reference polarization angle of the light beam in block 1204).

In block 1214, a change in polarization of the light beam is determined based on data received by the computing device. In some examples, the computing device can compare data received by the computing device for determining the change in polarization of the light-bean. For example, the computing device can compare the reference polarization angle, the amount of polarization of the first polarized light, and the amount of polarization of the second polarized light. In some examples, the computing device can determine a change in polarization of the light beam based on the comparison.

In block 1216, a presence, type, or amount of an analyte is determined based on the change in polarization of the light beam. In some examples, the computing device can be used to determine the presence, type, or amount of the analyte (e.g., the analyte in the fluid sample in block 1202). In some examples, the presence, type and amount of the analyte can be determined based on the amount of polarization of the first polarized light and the amount of polarization of the second polarized light. As an example, a ratio of the amount of polarization of horizontal polarized light (e.g., the amount of polarization of horizontal polarized light detected in block 1210) to the amount of polarization of vertical polarized light (e.g., the amount of polarization of vertical polarized light detected in block 1210) can indicate a polarization angle of the light beam. The polarization angle of the light beam can be compared to the reference polarization angle (e.g., the reference polarization angle in block 1204) for determining a change in polarization angle of the light beam (e.g., the change in polarization of the light beam in block 1202). The presence, type and amount of the can be determined based on the change in polarization angle of the light beam.

Figure 13:
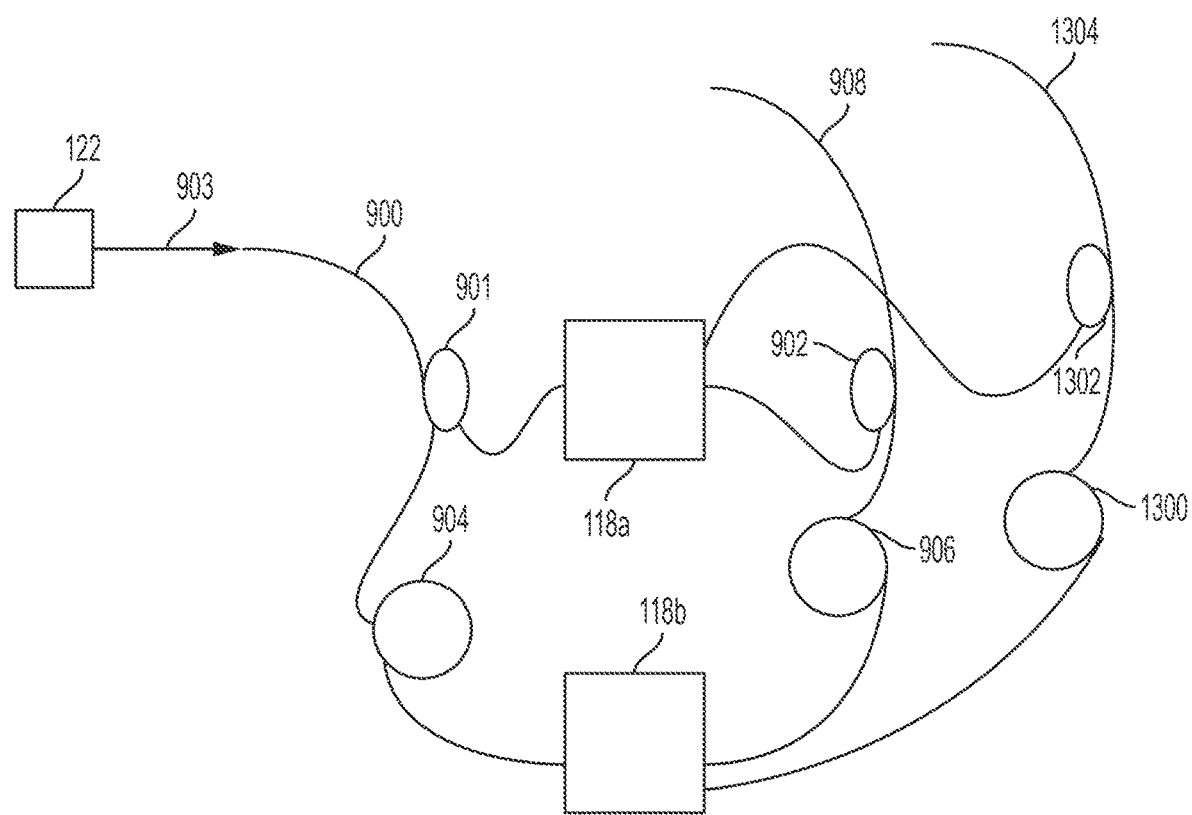
FIG. 13 is a schematic diagram showing an example of analyte sensors and a plurality of optical fibers, which can be used in a well system according to another example of the present disclosure.

In the example depicted in FIG. 9, two analyte sensors 118*a-b* are used with two optical fibers 900, 908. In other examples, any number of analyte sensors can be used with any number of optical fibers in a well system. For example, FIG. 13 is a schematic diagram showing an example of analyte sensors 118*a-b* and a plurality of optical fibers 900, 908, 1304, which can be used in a well system. Optical fiber 1304 can be configured in substantially the same manner as optical fiber 908 to guide light from the analyte sensors 118*a-b* in a wellbore to a surface of the wellbore. Delay coils 1300, 1302 can be configured in substantially the same manner as delay coils 904, 906 of FIG. 9. For example, delay coils 1300, 1302 may delay a portion of the light 903 from exiting the analyte sensors 118*a-b*.

In some aspects, systems and methods for determining a presence, type, or quantity of an analyte in a fluid sample are provided according to one or more of the following example:

Example #1: A system can include a light source for providing a beam of light. The system can also include a first analyte sensor comprising a substrate. The substrate can include chiral molecules for sensing analyte presence in a fluid sample in a sample chamber and causing a change in polarization of the beam of light passing through the substrate in the sample chamber.

Example #2: The system of Example #1 may feature the first analyte sensor including a reference polarizer positioned in a path of the beam of light for polarizing the beam of light from the light source prior to the beam of light traversing the substrate to cause the beam of light to have a first polarization angle. The first analyte sensor can also include a splitter positioned in the path for dividing the beam of light into at least a first light path and a second light path subsequent to the beam of light traversing the substrate. The first analyte sensor can also include a directional polarizer positioned after the sample chamber for forming a first polarized beam of light or a second polarized beam of light by polarizing the beam of light in the first light path or the second light path. The first analyte sensor can further include photodetectors positioned in the first light path and the second light path for converting: i) the first polarized beam of light to a first electrical signal indicating a first polarization amount of the first polarized beam of light; or ii) the second polarized beam of light to a second electrical signal indicating a second polarization amount of the second polarized beam of light.

Example #3: The system of any of Examples #1-2 may feature a processing module for receiving data. The data can correspond to the first polarization angle. The processing module can be communicatively coupled to the photodetectors for receiving the first electrical signal and the second electrical signal wherein the processing module comprises machine-readable code for comparing the first polarization angle, the first polarization amount of the first polarized beam of light, and the second polarization amount of the second polarized beam of light for determining the change in polarization of the beam of light.

Example #4: The system of any of Examples #1-3 may feature the first analyte sensor being positionable at a first location in a wellbore. The system can also include a second analyte sensor positionable at second location in the wellbore. The system can also include a first optical fiber to form a downhole path for light from the light source to the first analyte sensor and the second analyte sensor. The system can further include a first coupler for coupling the first analyte sensor to the second analyte sensor and for dividing the beam of light between the first analyte sensor and the second analyte sensor. The system can also include delay coil positioned between the first optical fiber, the first analyte sensor, and the second analyte sensor for causing a delay in providing the beam of light to the first analyte sensor or to the second analyte sensor. The system can also include a second optical fiber to form an up-hole path for light from the first analyte sensor and the second analyte sensor to the photodetectors, wherein the photodetectors are positionable at a surface of the wellbore.

Example #5: The system of any of Examples #1-4 may feature a first optical fiber to form a downhole path for light from the light source to the sample chamber, wherein the light source is positionable proximate to a surface of a wellbore and the sample chamber, the reference polarizer, the splitter, the first directional polarizer, and the second directional polarizer are positionable in the wellbore. The system can also include a second optical fiber to form a first up-hole path for the first polarized light from the directional polarizer to the photodetectors or the second polarized light from the directional polarizer to the photodetectors, wherein the photodetectors are positionable proximate to the surface of the wellbore. The system can also include a third optical fiber to form a second up-hole path for a first unpolarized light in the first light path or a second unpolarized light in the second light path.

Example #6: The system of any of Examples #1-4 may feature a first optical fiber to form a downhole path for light from the light source to the sample chamber wherein the light source is positionable proximate to a surface of a wellbore and the sample chamber, the reference polarizer, the splitter, the first directional polarizer, and the second directional polarizer are positionable in the wellbore. The system can also include a circulator positioned in the downhole path of the light for allowing the first optical fiber to form the downhole path and for allowing the first optical fiber to form a first up-hole path for the first polarized light from the first directional polarizer to the photodetectors. The system can also include a second optical fiber to form a second up-hole path for the second polarized light from the second directional polarizer to the photodetectors, wherein the photodetectors are positionable proximate to the surface of the wellbore.

Example #7: The system of any of Examples #1-4 may feature a first a first optical fiber to form a downhole path for light from the light source to the sample chamber, wherein the light source is positionable at a surface of a wellbore and the sample chamber, and the reference polarizer are positionable in the wellbore. The system can also include a second optical fiber to form an up-hole path for the light from the sample chamber to the splitter, wherein the splitter, the first directional polarizer, the second directional polarizer, and the photodetectors are positionable at the surface of the wellbore.

Example #8: The system of any of Examples #1-7 may feature a first collimator positioned in the path of light for aligning the beam of light prior to the beam of light being polarized by the reference polarizer. The system can also include a second collimator positioned in the path of light and between the sample chamber and the splitter for aligning the beam of light subsequent to the beam of light traversing the substrate.

Example #9: The system of any of Examples #1-8 may feature the splitter including at least one of a beamsplitter or a 1×2 coupler.

Example #10: The system of any of Examples #1-9 may feature the reference polarizer being a forty-five degree polarizer.

Example #11: The system of any of Examples #1-10 may feature the sample chamber including a channel for allowing the fluid sample to flow in or through the sample chamber, wherein the substrate comprises an optically active film positioned on at least a first wall of the sample chamber; and wherein the first wall is perpendicular to a path of the beam of light.

Example #12: The system of any of Examples #1-11 may feature the chiral molecules having properties for causing a response to the presence of an analyte in the fluid sample, the response including an orientation change or a position change of the chiral molecules and the response causing the change in polarization of the beam of light.

Example #13: A method can include transmitting, by a light source, a beam of light along a path and through a substrate that includes chiral molecules for sensing analyte presence in a fluid sample in a sample chamber and causing a change in polarization of the beam of light. The method can also include determining, by a computing device, the change in polarization of the beam of light based on data received by the computing device.

Example #14: The method of Example #13 may feature polarizing, by a reference polarizer positioned in the path of the beam of light, the beam of light prior to the beam of light traversing the substrate to cause the beam of light to have a first polarization angle. The method can also include dividing, by a splitter positioned in the path, the beam of light into at least a first light path and a second light path subsequent to the beam of light traversing the substrate. The method can further include polarizing, by a first directional polarizer positioned in the first light path, the beam of light in the first light path to form a first polarized light. The method can also include polarizing, by a second directional polarizer positioned in the second light path, the beam of light in the second light path to form a second polarized light. The method can also include converting, by photodetectors positioned in the first light path and the second light path, the first polarized light to a first electrical signal indicating a first polarization amount of the first polarized light and the second polarized light to a second electrical signal indicating a second polarization amount of the second polarized light.

Example #15: The method of any of Examples #13-14 may feature determining the change in polarization of the beam of light based on data received by the computing device including receiving, by the computing device, data corresponding to the first polarization angle. Determining the change in polarization of the beam of light based on data received by the computing device can also include receiving, by the computing device, the first electrical signal and the second electrical signal. Determining the change in polarization of the beam of light based on data received by the computing device can also include comparing, by the computing device, the first polarization angle, the first polarization amount of the first polarized light, and the second polarization amount of the second polarized light to determine the change in polarization of the beam of light. Determining the change in polarization of the beam of light based on data received by the computing device can also include outputting, by the computing device, data for determining a presence, type, and amount of an analyte in the fluid sample.

Example #16. The method of any of Examples #13-15 may feature transmitting the beam of light including guiding, by a first optical fiber, light from the light source to the sample chamber wherein the light source is positioned at a surface of a wellbore and the sample chamber is positioned in the wellbore. Transmitting the beam of light can also include guiding, by a second optical fiber, the first polarized light from the first directional polarizer to the photodetectors. Transmitting the beam of light can also include guiding, by a third optical fiber, the second polarized light from the second directional polarizer to the photodetectors wherein the photodetectors are positioned at the surface of the wellbore.

Example #17: The method of any of Examples #13-15 may feature guiding, by a first optical fiber, light from the light source to the sample chamber wherein the sample chamber and the reference polarizer are positioned in a wellbore. The method can also include guiding, by a second optical fiber, light from the sample chamber to the splitter wherein the splitter, the first directional polarizer, the second directional polarizer, and the photodetectors are positioned at a surface of the wellbore.

Example #18: A non-transitory computer-readable storage medium having programmed code that is executable by a processing device to cause a computing device to perform operations. The operations can include receiving data representing a first polarization angle of a beam of light after the beam of light is polarized by a reference polarizer and prior to the beam of light traversing a substrate including chiral molecules for sensing analyte presence in a fluid sample in a sample chamber and causing a change in polarization of the beam of light. The operations can also include receiving, from photodetectors, a first electrical signal indicating a first polarization amount of a first polarized light and a second electrical signal indicating a second polarization amount of a second polarized. The operations can also include determining the change in polarization of the beam of light based on data received by the computing device.

Example #19: The storage medium of Example #18 may feature the operation of determining the change in polarization of the beam of light including operations for comparing the first polarization angle, the first polarization amount of the first polarized light, and the second polarization amount of the second polarized light for determining a presence, type, and amount of an analyte in the fluid sample.

Example #20: The storage medium of any of Examples #18-19 may feature the operation of determining the change in polarization of the beam of light including outputting data for determining a presence, type, and amount of the analyte, the data corresponding to the first polarization angle, the first polarization amount of the first polarized light, and the second polarization amount of the second polarized light.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a light source for providing a beam of light; and
a first analyte sensor comprising a substrate that is perpendicular to a path of the beam of light and including chiral molecules for sensing analyte presence in a fluid sample in a sample chamber and causing a change in polarization of the beam of light passing through the substrate in the sample chamber.

2. The system of claim 1, wherein the first analyte sensor further comprises:
a reference polarizer positioned in a path of the beam of light for polarizing the beam of light from the light source prior to the beam of light traversing the substrate to cause the beam of light to have a first polarization angle;
a splitter positioned in the path for dividing the beam of light into at least a first light path and a second light path subsequent to the beam of light traversing the substrate;
a directional polarizer positioned after the sample chamber for forming a first polarized beam of light or a second polarized beam of light by polarizing the beam of light in the first light path or the second light path; and
photodetectors positioned in the first light path and the second light path for converting: i) the first polarized beam of light to a first electrical signal indicating a first polarization amount of the first polarized beam of light; or ii) the second polarized beam of light to a second electrical signal indicating a second polarization amount of the second polarized beam of light.

3. The system of claim 2, further comprising a processing module for receiving data corresponding to the first polarization angle, the processing module being communicatively coupled to the photodetectors for receiving the first electrical signal and the second electrical signal wherein the processing module comprises machine-readable code for comparing the first polarization angle, the first polarization amount of the first polarized beam of light, and the second polarization amount of the second polarized beam of light for determining the change in polarization of the beam of light.

4. The system of claim 3, wherein the first analyte sensor is positionable at a first location in a wellbore, the system further comprising:
a second analyte sensor positionable at second location in the wellbore;
a first optical fiber to form a downhole path for light from the light source to the first analyte sensor and the second analyte sensor;
a first coupler for coupling the first analyte sensor to the second analyte sensor and for dividing the beam of light between the first analyte sensor and the second analyte sensor;
a delay coil positioned between the first optical fiber, the first analyte sensor, and the second analyte sensor for causing a delay in providing the beam of light to the first analyte sensor or to the second analyte sensor; and
a second optical fiber to form an up-hole path for light from the first analyte sensor and the second analyte sensor to the photodetectors, wherein the photodetectors are positionable at a surface of the wellbore.

5. The system of claim 2, further comprising:
a first optical fiber to form a downhole path for light from the light source to the sample chamber, wherein the light source is positionable proximate to a surface of a wellbore and the sample chamber, the reference polarizer, the splitter, and the directional polarizer are positionable in the wellbore;
a second optical fiber to form a first up-hole path for the first polarized light from the directional polarizer to the photodetectors or the second polarized light from the directional polarizer to the photodetectors, wherein the photodetectors are positionable proximate to the surface of the wellbore; and
a third optical fiber to form a second up-hole path for a first unpolarized light in the first light path or a second unpolarized light in the second light path.

6. The system of claim 2, further comprising:
a first optical fiber to form a downhole path for light from the light source to the sample chamber wherein the light source is positionable proximate to a surface of a wellbore and the sample chamber, the reference polarizer, the splitter, and the directional polarizer are positionable in the wellbore;
a circulator positioned in the downhole path of the light for allowing the first optical fiber to form the downhole path and for allowing the first optical fiber to form a first up-hole path for the first polarized light from the directional polarizer to the photodetectors; and
a second optical fiber to form a second up-hole path for the second polarized light from the directional polarizer to the photodetectors, wherein the photodetectors are positionable proximate to the surface of the wellbore.

7. The system of claim 2, further comprising:
a first optical fiber to form a downhole path for light from the light source to the sample chamber, wherein the light source is positionable at a surface of a wellbore and the sample chamber, and the reference polarizer are positionable in the wellbore; and
a second optical fiber to form an up-hole path for the light from the sample chamber to the splitter, wherein the splitter, the directional polarizer, and the photodetectors are positionable at the surface of the wellbore.

8. The system of claim 2, further comprising:
a first collimator positioned in the path of light for aligning the beam of light prior to the beam of light being polarized by the reference polarizer; and
a second collimator positioned in the path of light and between the sample chamber and the splitter for aligning the beam of light subsequent to the beam of light traversing the substrate.

9. The system of claim 2, wherein the splitter includes at least one of a beamsplitter or a 1×2 coupler.

10. The system of claim 2, wherein the reference polarizer is a forty-five degree polarizer.

11. The system of claim 1, wherein the sample chamber includes a channel for allowing the fluid sample to flow in or through the sample chamber, wherein the substrate comprises an optically active film positioned on at least a first wall of the sample chamber; and wherein the first wall is perpendicular to a path of the beam of light.

12. The system of claim 1, wherein the chiral molecules have properties for causing a response to the presence of an analyte in the fluid sample, the response including an orientation change or a position change of the chiral molecules and the response causing the change in polarization of the beam of light.

13. A method comprising:
transmitting, by a light source, a beam of light along a path and through a substrate that is perpendicular to the path of the beam of light and that includes chiral molecules for sensing analyte presence in a fluid sample in a sample chamber and causing a change in polarization of the beam of light; and
determining, by a computing device, the change in polarization of the beam of light based on data received by the computing device.

14. The method of claim 13, further comprising:
polarizing, by a reference polarizer positioned in the path of the beam of light, the beam of light prior to the beam of light traversing the substrate to cause the beam of light to have a first polarization angle;
dividing, by a splitter positioned in the path, the beam of light into at least a first light path and a second light path subsequent to the beam of light traversing the substrate;
polarizing, by a first directional polarizer positioned in the first light path, the beam of light in the first light path to form a first polarized light;
polarizing, by a second directional polarizer positioned in the second light path, the beam of light in the second light path to form a second polarized light; and
converting, by photodetectors positioned in the first light path and the second light path, the first polarized light to a first electrical signal indicating a first polarization amount of the first polarized light and the second polarized light to a second electrical signal indicating a second polarization amount of the second polarized light.

15. The method of claim 14, wherein determining the change in polarization of the beam of light based on data received by the computing device includes:
receiving, by the computing device, data corresponding to the first polarization angle;
receiving, by the computing device, the first electrical signal and the second electrical signal;
comparing, by the computing device, the first polarization angle, the first polarization amount of the first polarized light, and the second polarization amount of the second polarized light to determine the change in polarization of the beam of light; and
outputting, by the computing device, data for determining a presence, type, and amount of an analyte in the fluid sample.

16. The method of claim 14, wherein transmitting the beam of light includes:

guiding, by a first optical fiber, light from the light source to the sample chamber wherein the light source is positioned at a surface of a wellbore and the sample chamber is positioned in the wellbore;
guiding, by a second optical fiber, the first polarized light from the first directional polarizer to the photodetectors; and
guiding, by a third optical fiber, the second polarized light from the second directional polarizer to the photodetectors wherein the photodetectors are positioned at the surface of the wellbore.

17. The method of claim 14, further comprising:
guiding, by a first optical fiber, light from the light source to the sample chamber wherein the sample chamber and the reference polarizer are positioned in a wellbore; and
guiding, by a second optical fiber, light from the sample chamber to the splitter wherein the splitter, the first directional polarizer, the second directional polarizer, and the photodetectors are positioned at a surface of the wellbore.

18. A non-transitory computer-readable storage medium having program code that is executable by a processor device to cause a computing device to perform operations, the operations comprising:
receiving data representing a first polarization angle of a beam of light after the beam of light is polarized by a reference polarizer and prior to the beam of light traversing a substrate that is perpendicular to a path of the beam of light and including chiral molecules for sensing analyte presence in a fluid sample in a sample chamber and causing a change in polarization of the beam of light;
receiving, from photodetectors, a first electrical signal indicating a first polarization amount of a first polarized light and a second electrical signal indicating a second polarization amount of a second polarized light; and
determining the change in polarization of the beam of light based on data received by the computing device.

19. The non-transitory computer-readable storage medium of claim 18, wherein the operation of determining the change in polarization of the beam of light includes:
comparing the first polarization angle, the first polarization amount of the first polarized light, and the second polarization amount of the second polarized light for determining a presence, type, and amount of an analyte in the fluid sample.

20. The non-transitory computer-readable storage medium of claim 18, wherein the operation of determining the change in polarization of the beam of light includes:
outputting data for determining a presence, type, and amount of the analyte, the data corresponding to the first polarization angle, the first polarization amount of the first polarized light, and the second polarization amount of the second polarized light.

* * * * *